US009961089B1

(12) United States Patent
Sun et al.

(10) Patent No.: US 9,961,089 B1
(45) Date of Patent: May 1, 2018

(54) DISTRIBUTED ESTIMATION AND DETECTION OF ANOMALIES IN CONTROL SYSTEMS

(71) Applicant: Mitsubishi Electric Research Laboratories, Inc., Cambridge, MA (US)

(72) Inventors: Hongbo Sun, Lexington, MA (US); Ariana Minot, Somerville, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days. days.

(21) Appl. No.: 15/298,392

(22) Filed: Oct. 20, 2016

(51) Int. Cl.
*G06F 11/00* (2006.01)
*H04L 29/06* (2006.01)
*H02J 13/00* (2006.01)
*G05B 23/02* (2006.01)

(52) U.S. Cl.
CPC .......... *H04L 63/14* (2013.01); *G05B 23/0208* (2013.01); *H02J 13/00* (2013.01)

(58) Field of Classification Search
CPC . H04L 63/1416; H04L 63/1408; H04L 63/14; G06Q 10/04
USPC .......................................................... 726/23
See application file for complete search history.

(56) References Cited

U.S. PATENT DOCUMENTS 6,396,283 B1 * 5/2002 Kimoto ................. F02D 11/106 324/523
7,472,099 B2 * 12/2008 Nishiuma ............. G06Q 10/04 706/14
7,761,923 B2 * 7/2010 Khuti ...................... H04L 63/02 726/11
8,595,831 B2 11/2013 Skare
9,203,859 B2 12/2015 Sampigethaya
9,396,283 B2 * 7/2016 Miranker .......... G06F 17/30932
2005/0085967 A1 * 4/2005 Mitsueda .......... B60W 50/0205 701/36
2005/0091176 A1 * 4/2005 Nishiuma ............. G06Q 10/04 706/45
2007/0046274 A1 * 3/2007 Matsuoka ............ H02H 7/1225 323/283

(Continued)

OTHER PUBLICATIONS

Shyh-Jier, Huang, "Enhancement of Anomalous Data Mining in Power System Predicting-Aided State Estimation" IEEE, Feb. 2004.*

*Primary Examiner* — Samson Lemma
(74) *Attorney, Agent, or Firm* — Gene Vinokur; James McAleenan; Hironori Tsukamoto

(57) ABSTRACT

Methods and Systems for detecting anomalies in a control area of a control system. Estimating for the control area, a first state from a historical state over a first time period using a model of dynamics, and defining a transition of the first state as a function of control inputs, the first state includes a generator state for each generator, the control inputs include a network state for each bus, a mechanical input to each generator or power consumptions at the buses. Updating estimated first state, by connecting measurements of rotor frequency of each generator and measurements of the network states on the buses with the generator state of each generator, to obtain a second state over a second time period later than the first time period, and detecting anomalies based on a statistic deviation of the second state from its corresponding prediction derived from the first state.

20 Claims, 14 Drawing Sheets

202
207 Partitioning EPS into multiple neighboring control areas, including a first control area
209 Historical Data of EPS including Current States
221 State Dynamics Model -estimates current states of generators in first control area
226 Neighboring Control Area States and Attributes
236 Measurement Model -Updating current state of generators in first control area on the basis of: ▪Estimated current states of the generator and network in the first control area ▪Received states and attributes from the neighboring control areas ▪Measurements from the first control area
233 Measurements -determining current states of generators and buses
261 Anomaly Detection Model -Determining anomaly based on statistic of deviation of measurement residuals of first control)
271 Updated current state and detected anomaly

(56) References Cited

U.S. PATENT DOCUMENTS

| | | | | |
|---|---|---|---|---|
| 2007/0088448 | A1* | 4/2007 | Mylaraswamy | G05B 23/0254 700/44 |
| 2011/0276828 | A1* | 11/2011 | Tamaki | G05B 23/0254 714/26 |
| 2014/0137246 | A1* | 5/2014 | Baluda | G06F 21/552 726/22 |
| 2014/0189860 | A1 | 7/2014 | Hull Roskos | |
| 2014/0283047 | A1* | 9/2014 | Dixit | G06F 21/55 726/23 |
| 2015/0281278 | A1 | 10/2015 | Gooding et al. | |
| 2016/0366170 | A1* | 12/2016 | Bell | H04L 63/1425 |
| 2017/0315523 | A1* | 11/2017 | Cross | G05B 17/02 |

* cited by examiner

DISTRIBUTED ESTIMATION AND DETECTION OF ANOMALIES IN CONTROL SYSTEMS

FIELD

The present disclosure relates generally to electric power systems, and more particularly to electrical anomaly detection in electric power systems.

BACKGROUND

Anomaly detection has been applied to control systems to increase cyber-physical security and optimize operations of a control system. The principles typically used in anomaly detection can include identifying normal behavior and a threshold selection procedure for identifying anomalous behavior. Usually, the challenge is to develop a method that is able to detect the abnormalities specific to an industry's needs.

An anomaly such as a cyber-physical attack may be undetectable from tampered measurements if there is a set of normal operating conditions consistent with the tampered measurements. Conventional cyber-physical attack detection approaches are centralized implemented.

In cyber-physical attack security applications one of the major problems is distinguishing between normal circumstance and "anomalous" or "abnormal" circumstances. For example, malfunction mechanical devices can be viewed as abnormal modifications to normal programs. The detection of anomalous activities is a difficult problem in which the detection of anomalous activities is disadvantaged by not having appropriate data and/or because of the variety of different activities that need to be monitored. Additionally, protective measures based on established conventional practices are vulnerable to activities designed specifically to undermine these assumptions.

Therefore, there is a need for developing more advanced distributed methods for real-time estimation and detection of anomalies in control systems.

SUMMARY

The present disclosure relates to methods and systems of dynamic state estimation of Electric Power Systems (EPS) for detecting anomalies in control areas of a control system having multiple control areas. The disclosure includes methods and systems relating to the detection of anomalies in a control area positioned within a multiple of neighbouring control areas in the control system that takes into account both process and measurement anomalies.

According to embodiments of the present disclosure, the methods and systems for dynamic state estimation are based on partitioning a control area from the multiple neighboring control areas in the control system, and detecting the anomalies for that individual control area.

Specifically, the present disclosure is based on the realization that dynamics of the control area can be decoupled if the voltage phase angles on the buses are treated as control inputs to a model of dynamics of the control area defining a transition of the state of the control area as a function of control inputs. At least one aspect regarding the decoupling dynamics of the control area from the control system, is that it allows for detecting anomalies within an individual control area rather than for the entire control system.

This is significant, because convention control system state variables include states of generators and buses, i.e., a rotor angle and a rotor frequency of generators and voltage phase angles on buses for the entire control system and not for a single control area. The states of the convention control system are globally coupled because the phase angle on a bus is related to the states of all buses within the control system. Cyber-attacks target entire computer information systems and infrastructures such as control systems, by manipulating with measurements of the control system as part of cyberterrorism. Resulting in the cyber-attacks being undetectable from tampered measurements of convention control systems, if there is a set of normal operating conditions consistent with those measurements when detection is based on the entire central system.

We realized that by avoiding centralized processing, and focusing on a single control area we make it more difficult for cyber-attackers to stage a global attack on the entire control system.

Our realization of decoupling dynamics of the control area from the entire control systems is contrary to the technical engineering principles of the structured network of the conventional control system, due to the fact that system networks of electrical components used to supply, transfer and use electric power are a dynamically coupled system. In other words, the conventional control system has a state on a bus of the generator that depends on states of all buses in the entire conventional control system, so that to detect a cyber-attack on one control area, the state of the entire conventional control system is required. The reason for this requirement is that the model of dynamics for the entire conventional control system's state transition is coupled together, and the measurement model of the conventional control system is also coupled together, which requires that any test for detecting a cyber-attack must be for the entire conventional control system and not for a single control area, as according the present disclosure. Another realization that the methods and systems of the present disclosure are based on is that the state of generators can be estimated according to a measurement model of the first control area, i.e. control area, connecting measurements of the rotor frequency of each generator and measurements of the voltage phase angles on the buses of the control area with the rotor angle and the rotor frequency of each generator of the control area. For example, we are able to estimate a first state of the control area from a historical state of the control area over a first state time period using a model of dynamics of the control area. In order to determine a transition of the first state of control area we used a function of control inputs, where the state of the control area includes a rotor angle and a rotor frequency for each generator in the control area. Based on the control inputs including one or combination of phase angles on the buses of the control area, phase angles on some neighbouring buses of neighbouring control areas, a mechanical input to each generator in the control area, or power consumptions at the buses in the control area. Essentially, embodiments of the present disclosure are based on tracking the dynamic relationship between local states and local operational measurements to detect the anomalies or cyber-attack in a distributed fashion with limited neighbouring communications. Wherein, no new measurements or devices are needed or required to be added to the EPS system, which provides an unencumbered implementation for the methods and systems of the present disclosure into the control systems industry.

We further realized that a cyber-attack can be detected in a distributed fashion based on a statistic deviation of the state of the local area, control area, from a normal state of the local area even considering uncertainties of the model of dynamics and the model of measurements. Wherein we use a Kalman filter based approach to deal with the level of ambiguity under which we assess how likely a cyber-attack has occurred introduced by the statistic deviation or noises. The Kalman filter can be distributed applied for each control area through iterative liner solvers and a neighborhood-approximation to an estimated state covariance matrix. In comparison, the estimated state covariance used in a centralized Kalman filter is, in general full, due to the global coupling of the bus voltages with the generator rotor angles for an interconnected power system.

We also formulate the dynamic state estimation problem using a structure-preserving model that preserves the sparse coupling of the dynamics. Both the generator state, i.e., rotor angle and frequency of each generator, and the network state, i.e., voltage phase angle at each bus, are considered in the estimation. Wherein we decompose the problem in such a way that each control area solves a problem of reduced dimension, and a decoupled state-space formulation is also used to avoid communication requirements between all generators.

For example, we updated the first state of the control area according to a measurement model of the control area, by connecting measurements in the control area of the rotor frequency of each generator and measurements of the phase angles on the buses, with the rotor angle and the rotor frequency of each generator in the control area, to obtain a second state of the control area over a second state time period that is later than the first state time period. Wherein we were able to detect the cyber-attack based on a statistic deviation of the second state of the control area from its corresponding prediction derived from the first state of the control area.

The local attack detection statistic is designed jointly with the dynamic state estimation in order to limit communication requirements. The communication requirements consist of buses' sharing their weighted measurement residuals within a user-specified neighborhood. The size of the neighborhood can be adjusted to allow for a tradeoff between accuracy and communication overhead.

According to another embodiment of the disclosure, a method for detecting anomalies in a control area of a control system with multiple control areas. The control area includes a set of generators in communication with a set of buses and some neighboring buses of neighboring controls area of the control system. The method including accessing a memory in communication with at least one processor, wherein the memory includes stored historical states of the control area. Estimating, by the processor, a first state of the control area over a first state time period from the historical states of the control area. Using a model of dynamics of the control area, and defining a transition of the first state of the control area as a function of control inputs. Wherein the first state of the control area includes a generator state for each generator in the control area. Further, wherein the control inputs include one or combination of: a network state for each bus in the control area; a network state for some neighboring buses of neighboring controls areas; a mechanical input to each generator in the control area or power consumptions at the buses in the control area. Updating, by the processor, the estimated first state of the control area according to a measurement model of the control area, by: connecting measurements of the rotor frequency of each generator; a weighted combination of measurements of the network states on the buses in the control area and some neighboring buses of neighboring controls areas; with the generator state of each generator in the control area, to obtain a second state of the control area over a second state time period later than the first state time period. Detecting, by the processor, the anomalies based on a statistic deviation of the second state of the control area from its corresponding prediction derived from the first state of the control area.

According to another embodiment of the disclosure, a system for detecting anomalies in a control area of a power system with multiple control areas. The control area includes a set of generators in communication with a set of buses and some neighboring buses of neighboring controls area of the control system. The system including a computer readable memory to store historical states of the control area, current states of the control area, a model of dynamics of the control area and a measurement model of the control area. A set of sensors arranged to sense measurements in the control area for the set of generators, the set of buses and to measure one or combination of rotor frequencies for each generator, voltage phase angles on the buses, a mechanical input to each generator, or power consumptions at the buses. A processor in communication with the computer readable memory configured is to: estimate a first state of the control area from a historical state of the control area over a first state time period using the stored model of dynamics of the control area, and defining a transition of the first state of the control area as a function of control inputs. Wherein the first state of the control area includes a rotor angle and a rotor frequency for each generator in the control area. Further, wherein the control inputs include one or combination of phase angles on the buses of the control area, a mechanical input to each generator in the control area, and power consumptions at the buses in the control area. Update the estimated first state of the control area according to the stored measurement model of the control area, by connecting measurements of the rotor frequency of each generator in the control area and a weighted combination of measurements of the voltage phase angles on the buses of the control area and some neighboring buses of the neighboring control areas, with the rotor angle and the rotor frequency of each generator in the control area, to obtain a second state of the control area over a second state time period later than the first state time period. Detect the anomalies based on a statistic deviation of the second state from its corresponding prediction derived from the first state of the control area.

According to another embodiment of the disclosure, a detector for detecting anomalies in a control area of an electric power system (EPS) with multiple control areas. The control area includes a set of generators in communication with a set of buses and some neighboring buses of neighboring controls area of the control system. The detector includes acquiring a plurality of measurements from sensors configure for sensing the set of generators and the set of buses over a first state time period. Acquiring a respective second plurality of measurements from sensors configure for sensing the set of generators and the set of buses over a second state time period. At least one processor having a computer readable memory configured to receive the plurality of measurements sensed by the sensors over the first state time period. Estimate a first state of the control area from a historical state of the control area over the first state time period using a model of dynamics of the control area, and defining a transition of the first state of the control area as a function of control inputs. Wherein the first state of the control area includes a rotor angle and a rotor frequency for each generator in the control area, wherein the control inputs include one or combination of phase angles on the buses of the control area, a mechanical input to each generator in the control area, and power consumptions at the buses in the control area. Receive the plurality of measurements sensed by the sensors over the second state time period. Update the estimated first state of the control area according to a measurement model of the control area, by connecting sensed measurements of the rotor frequency of each generator in the control area and a weighted combination of sensed measurements of the phase angles on the buses of the control area and some neighboring buses of the neighboring control areas, with the rotor angle and the rotor frequency of each generator in the control area, to obtain a second state of the control area over the second state time period later than the first state time period. Detect the anomalies based on a statistic deviation of the second state of the control area from its corresponding prediction derived from the first state of the control area.

Further features and advantages of the present disclosure will become more readily apparent from the following detailed description when taken in conjunction with the accompanying Drawing.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1A:
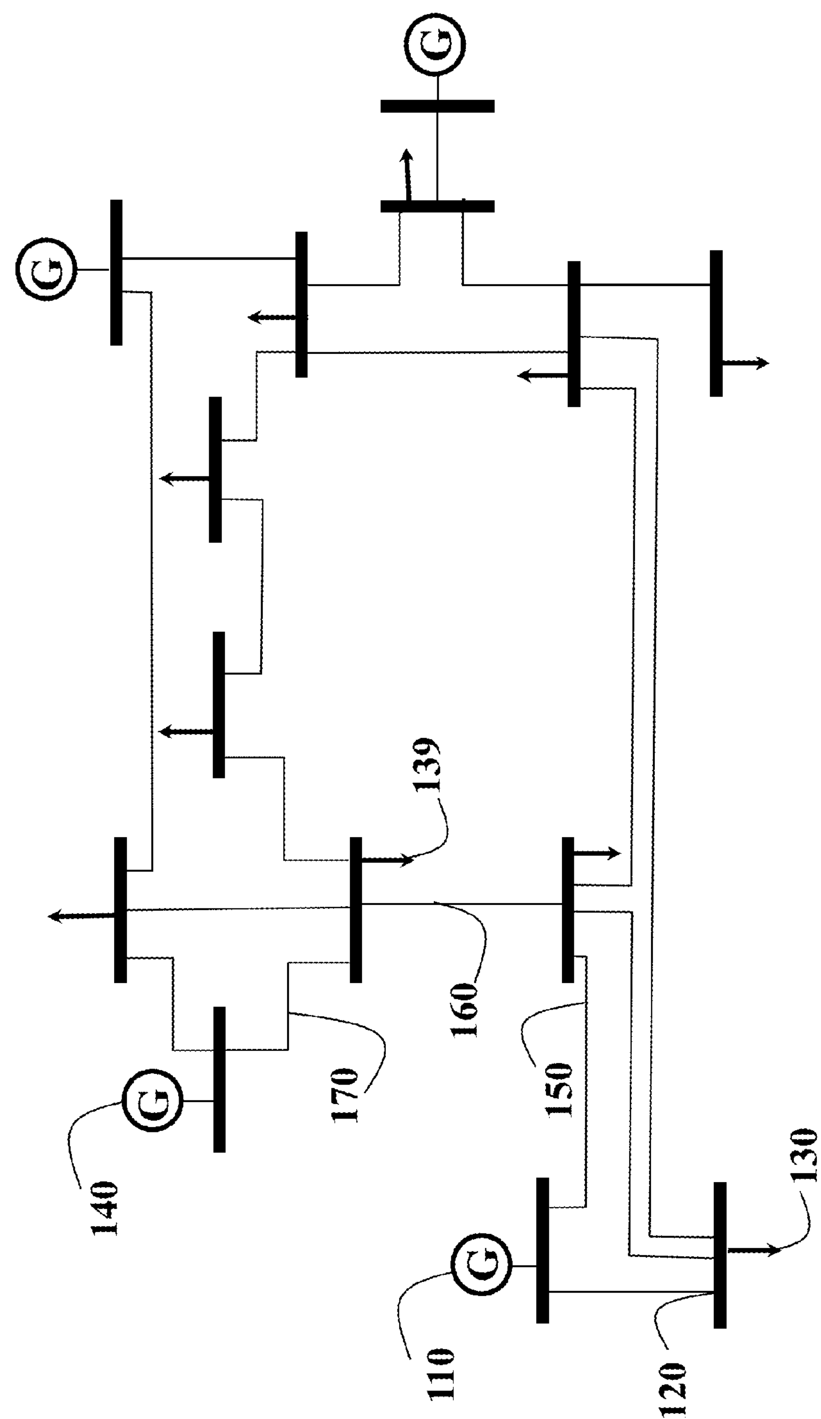
FIG. 1A is a schematic of a power network in which anomalies and/or cyber-physical attacks are detected, according to one embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof.

When implemented in software, firmware, middleware or microcode, the program code or code segments to perform the necessary tasks may be stored in a machine readable medium. A processor(s) may perform the necessary tasks.

Definition of Terms

We use $v_k$ to denote the k-th entry of a vector v, and the (i, j)-th entry of a matrix M is given by $M_{ij}$. The i-th row of a matrix M is denoted $M_i$. The transpose of a vector or matrix X is denoted by $X^T$. The inverse of a matrix M is denoted by $M^{-1}$. The entry-wise matrix multiplication is denoted $\otimes$. A matrix M is positive definite is denoted M>0, and A>B means A−B>0.

The present disclosure is directed to dynamic state estimation in electric power systems (EPS), for detecting anomalies in control areas of a control system having multiple control areas. In particular, the detection of anomalies in a single control area positioned within a multiple of neighbouring control areas in the control system that takes into account both process and measurement anomalies.

Specifically, the present disclosure is based on realizing that dynamics of the control area can be decoupled if the phase angles on the buses are treated as control inputs to a model of dynamics of the control area defining a transition of the state of the control area as a function of control inputs. At least one aspect regarding the decoupling dynamics of the control area from the control system, is that it allows for detecting anomalies within an individual control area rather than for the entire control system. Thus, by avoiding centralized processing, and focusing on a single control area we make it more difficult for cyber-attackers to stage a global attack on the entire control system.

The methods and systems of the present disclosure are also based on that the state of generators can be estimated according to a measurement model of the first control area, i.e. control area, connecting measurements of the rotor frequency of each generator and measurements of the voltage phase angles on the buses of the control area with the rotor angle and the rotor frequency of each generator of the control area. For example, we estimate a first state of the control area from a historical state of the control area over a first state time period using a model of dynamics of the control area.

In order to determine a transition of the first state of control area we use a function of control inputs, where the state of the control area includes a rotor angle and a rotor frequency for each generator in the control area. Based on the control inputs including one or combination of phase angles on the buses of the control area and neighbouring border buses, a mechanical input to each generator in the control area or power consumptions at the buses in the control area. In other words, we are essentially tracking the dynamic relationship between local states and local operational measurements to detect the anomalies or cyber-attack in a distributed fashion.

We then update the estimated first state of the control area according to a measurement model of the control area, by connecting measurements of the rotor frequency of each generator in the control area and measurements of the weighted phase angles on the buses of the control area, with the rotor angle and the rotor frequency of each generator in the control area, to obtain a second state of the control area over a second state time period later than the first state time period. Lastly, we detect the anomalies based on a statistic deviation of the second state of the control area from its corresponding prediction derived from the first state of the control area.

Formulation for State Space Model and Attack Detection of a Power System

FIG. 1 is a schematic of a power network in which anomalies and/or cyber-physical attacks are detected, according to one embodiment of the present disclosure. The system includes a set of generators 110, 140 and connected to a set of loads 130, 139 through transmission lines 150, 160. A generator 110, or load 130 is connected to the system through a bus 120, and a line 150 is connected to the system through two terminal buses.

The neighbourhood distance is used in the present disclosure to determine the communication requirements between generators or portions of power system. The distance of neighbourhood, that is the distance between a pair of neighboring generators or loads in term of number of hops, is measured by the number of connected branches residing in the path between the neighboring buses that the generators or loads connect to. For example, generator 110 is connected to generator 140 through 3 transmission lines, 150, 160 and 170, therefore generator 110 and generator 140 is 3-hop neighbors.

The power system is partitioned to be a set of control areas in the present disclosure. Two adjacent control areas may have common transmission lines, but there are no overlapping buses between two control areas.

Figure 1B:
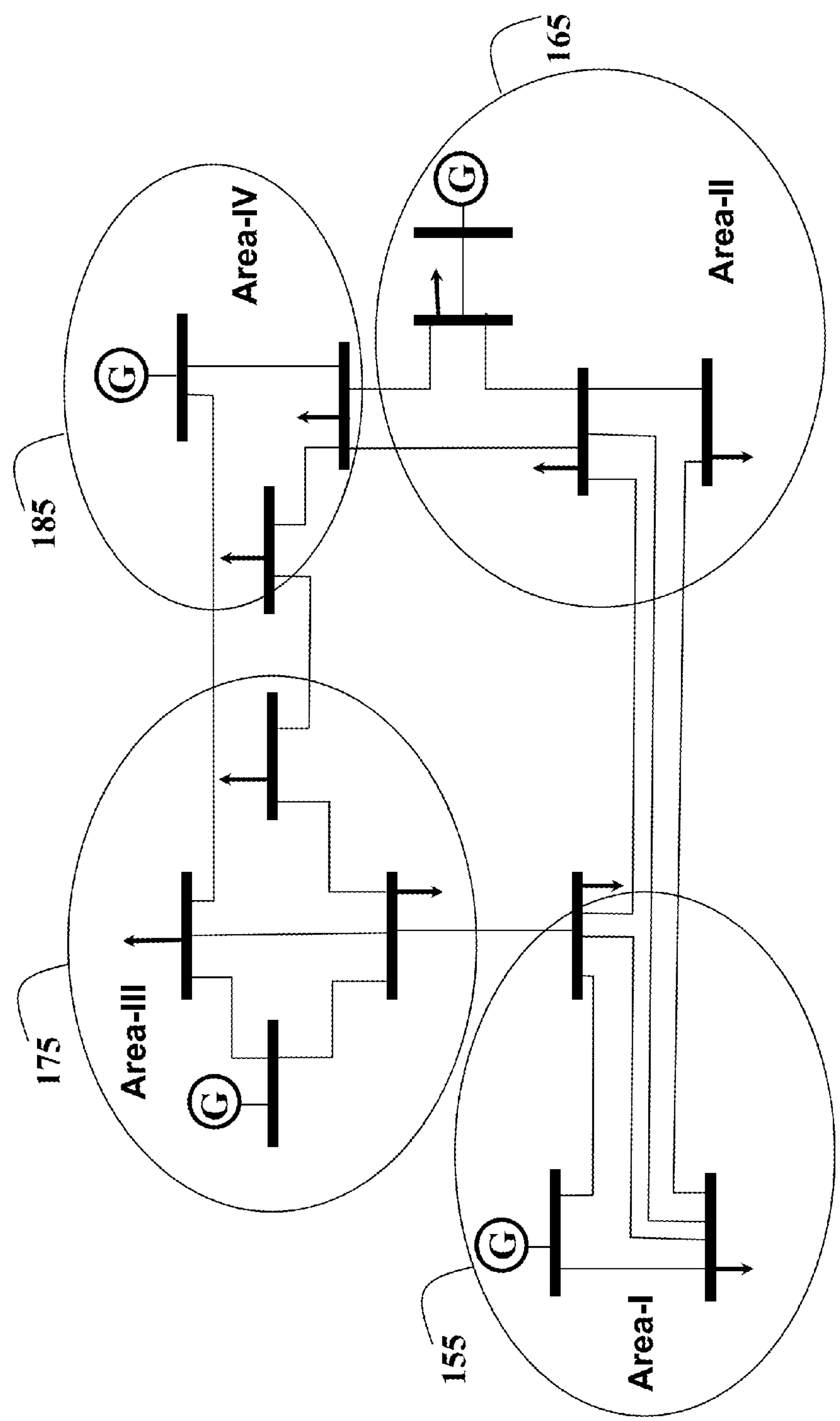
FIG. 1B is a schematic for partitioning the power network into multiple control areas that anomalies and/or cyber-physical attacks are detected independently for each control area with limited communications with neighbors, according to one embodiment of the present disclosure.

FIG. 1B is a schematic for partitioning the exemplar power network into multiple control areas that cyber-physical attack detected independently for each area with limited communications with neighbors. In FIG. 1B, the original power system as shown in FIG. 1A is partitioned 4 control areas, including area I, 155, area II, 165, area III, 175 and area IV, 180.

The anomalies and/or cyber-physical attacks are detected based on dynamic state estimation of the power system. The state estimation may use a set of measurements or input information acquired by a set of sensors from the system.

Figure 1C:
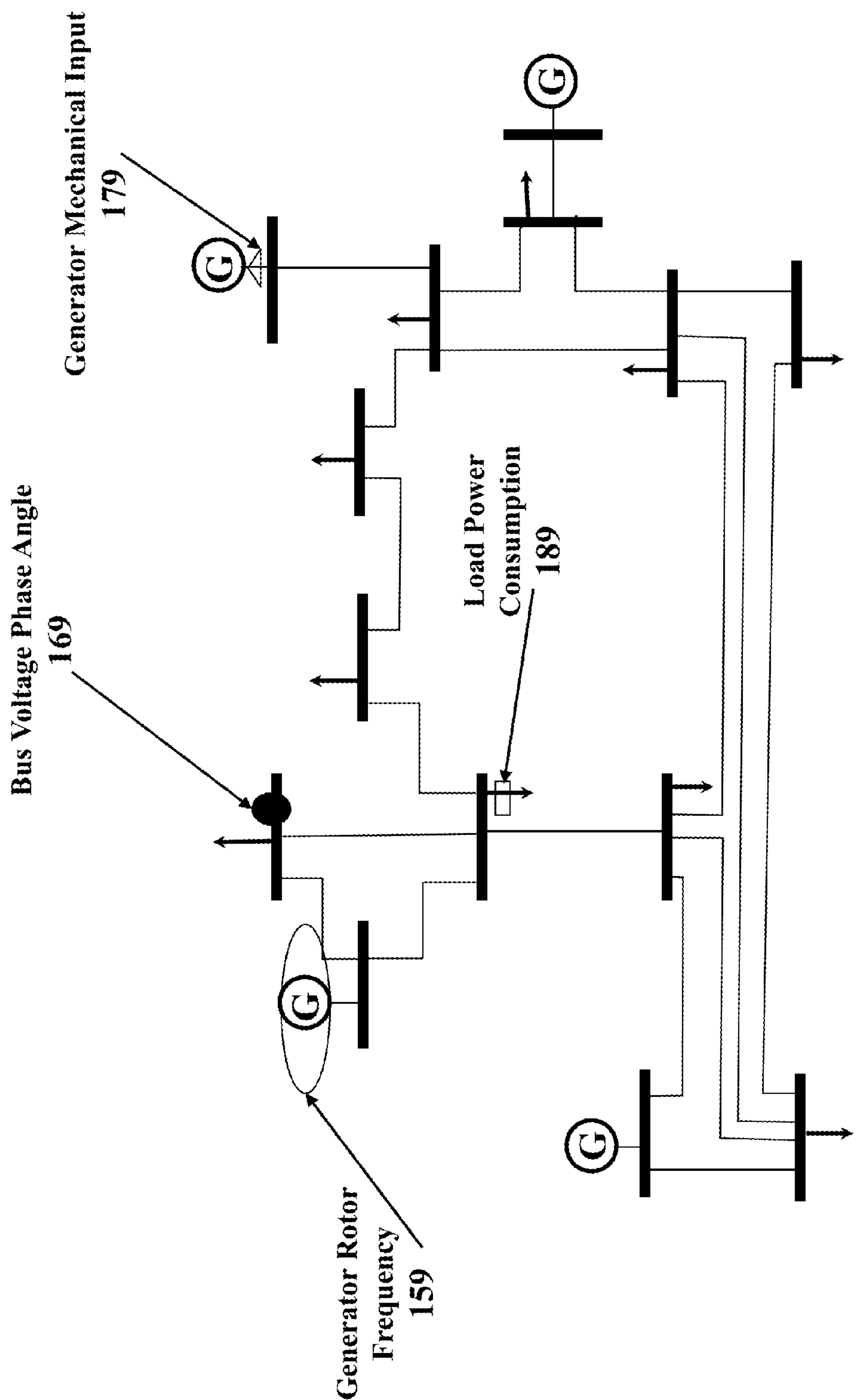
FIG. 1C is a schematic for a measurement configuration of the power network, according to some embodiments of the present disclosure.

FIG. 1C is a schematic for measurement configuration of the power system, according to embodiments of the present disclosure. The measurements may include the rotor frequencies of generators, 159, and voltage phase angles of buses 169. The generator mechanical inputs of generators, 179 and load power consumption at buses, 189 can also be available for estimating system states and detecting anomalies.

Figure 2A:
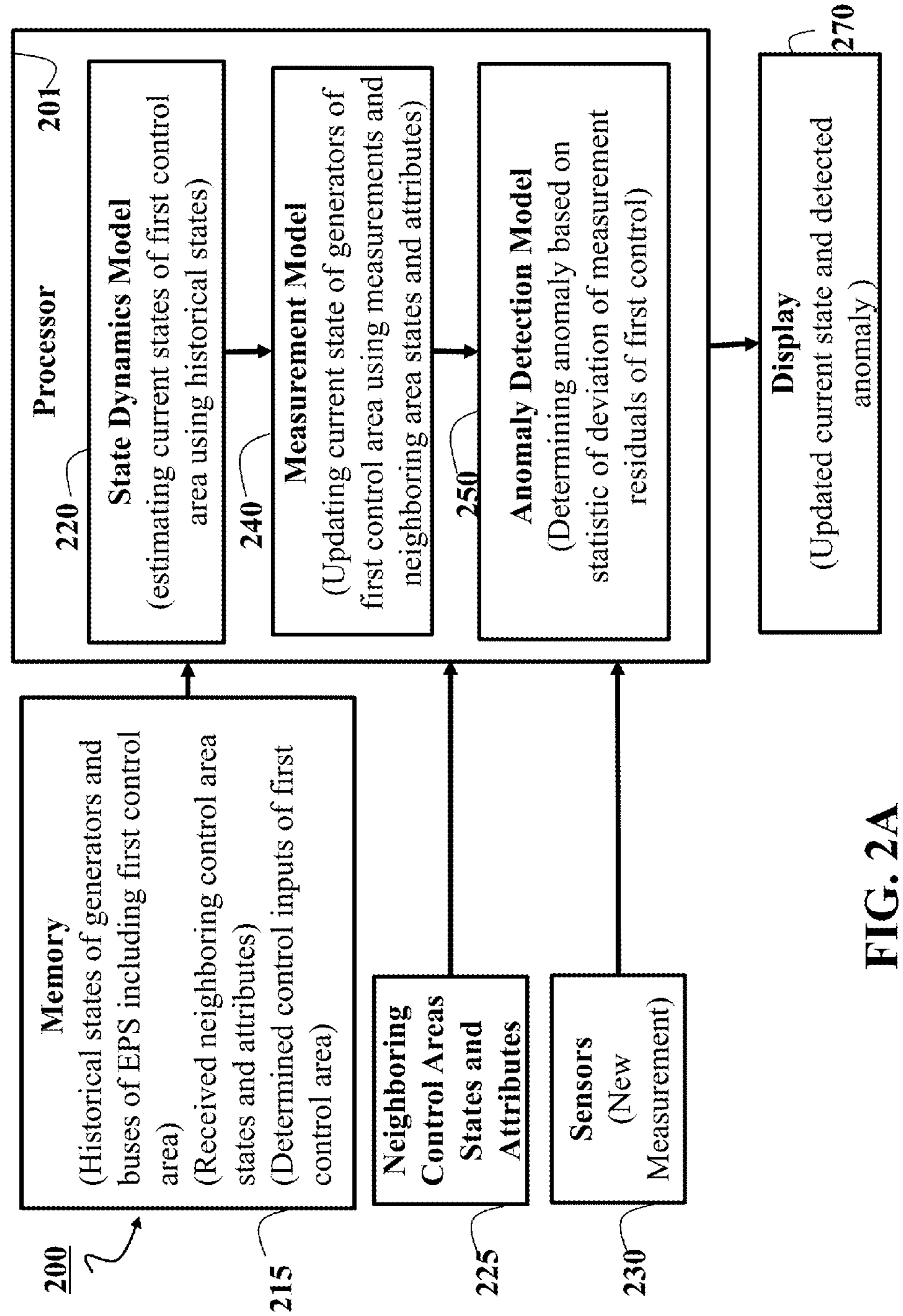
FIG. 2A is a schematic block diagram of an example of a control system that may be used with one or more embodiments described herein, according to some embodiments of the present disclosure.

FIG. 2A is a schematic block diagram of an example of a control system 200 that may be used with one or more embodiments described herein. The control system 200 may comprise of at least one processor 201, and a memory 215 connected to the processor 201, as well as a set of sensors 230. Further, the control system 200 includes communication from neighbouring control areas 225 regarding neighbouring areas' states and attributes. Contemplated may include one or more network interfaces (e.g., wired, wireless, PLC, etc.) used with the system. Also contemplated may bet at least one power supply (i.e. battery, plug-in, etc.) may be used with the control system.

Still referring to FIG. 2A, the memory 215 can be implemented within the processor 201 and/or external to the processor 201. In some embodiments, the memory 215 stores historical states of generators and buses of EPS including a first control area, received neighbouring control area states and attributes and determined control inputs of the first control area.

Similarly, the memory 215 can store the state dynamic model 220, measurement model 240, anomaly detection model 250, and/or instructions to the processor 201 of how to use the state dynamics model 220, measurement model 240 and anomaly detection model 250. For example, in various embodiments, the processor 201 determines estimations of the updated generator rotor angles and frequencies corresponding to the updated current state using the measurement model that relates the measurements to state variables.

Still referring to FIG. 2A, in some embodiments, the processor 201 can include functionality blocks including a state dynamics model block 220, a measurement model block 240, and an anomaly detection model block 250. The data receiving, estimation execution, and results transmitting can be implemented in the processor 201.

Further, the processor 201 may comprise hardware elements or hardware logic adapted to execute software programs and manipulate data structures. The memory 215 may include an operating system, portions of which can typically resident in memory 215 and executed by the processor 201, functionally organizes the control system by, inter alia, invoking operations in support of software processes and/or services executing on the device.

As may be apparent to those skilled in the art that other processor and memory types, including various computer-readable media, may be used to store and execute program instructions pertaining to the techniques described herein. Also, while the description illustrates various processes, contemplated may be that various processes can be embodied as modules configured to operate in accordance with the techniques herein (e.g., according to the functionality of a similar process). Further, while the processes have been shown separately, those skilled in the art will appreciate that processes may be routines or modules within other processes.

Still referring to FIG. 2A, the set of sensors 230 can include phasor measurement units which provide measurements for voltage phase angle for a bus. The sensors 230 can also include remote measurement units which provide the rotor frequency for a bus.

The system 200 can also include a screen or display 270. In some embodiments, the result of the anomaly detection can be rendered on the display 270 or submitted to different applications that can be internal or external to the system. For example, the results can be sent to a real-time security control and prevention application which can be added to the processor 201.

Figure 2B:
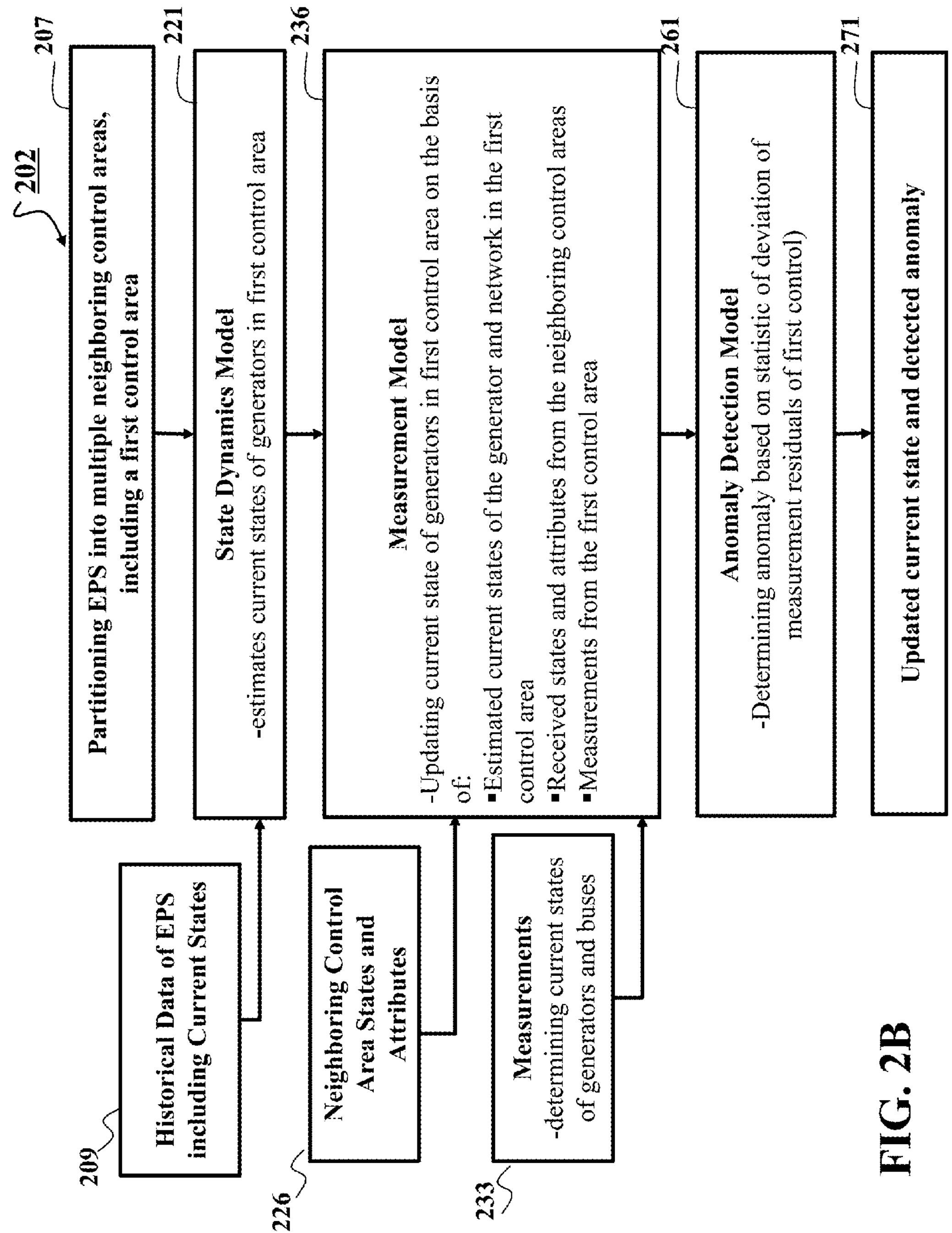
FIG. 2B is a block diagram of a method for distributed estimation and detection of anomalies in in an electric power system (EPS), according to one embodiment of the present disclosure.

FIG. 2B is a block diagram of a method 202 for distributed estimation and detection of anomalies in in an electric power system (EPS), according to one embodiment of the present disclosure. The method including partitioning the EPS into multiple neighbouring control areas 207, wherein the multiple neighbouring control areas include a first control area. Further, estimating current states of generators in the first control area using the states of the generators via a state dynamics model 221 of the generators of the first control area, wherein the states of the generators is from historical data of the EPS 209. Further, receiving, over a communication channel, a current state and attribute of at least some of neighbouring buses located in the neighboring control areas 226. Wherein the neighbouring buses are the buses of neighbouring control areas that connects to at least one boarder bus of the first control area via at least one transmission line within pre-determined neighbourhood distance. Determining measurements of states from generators and buses in the first control area 233. Then, updating the current state of the generators in the first control area using a measurement model 236 on a basis of the estimated current states of the generators in the first control area, the received states and attributes from the neighbouring control areas, and the measurements of states from at least some generators and buses in the first control area. Finally, determining anomaly based on statistic of deviation of measurement from the states of first control area using anomaly detection model 261, so as to update the current state and anomaly status 272. Wherein at least some steps of the method are performed by one or more processor and the updated current state and detection results may be displayed on a display, i.e. monitor or some other related electronic display device.

Figure 2C:
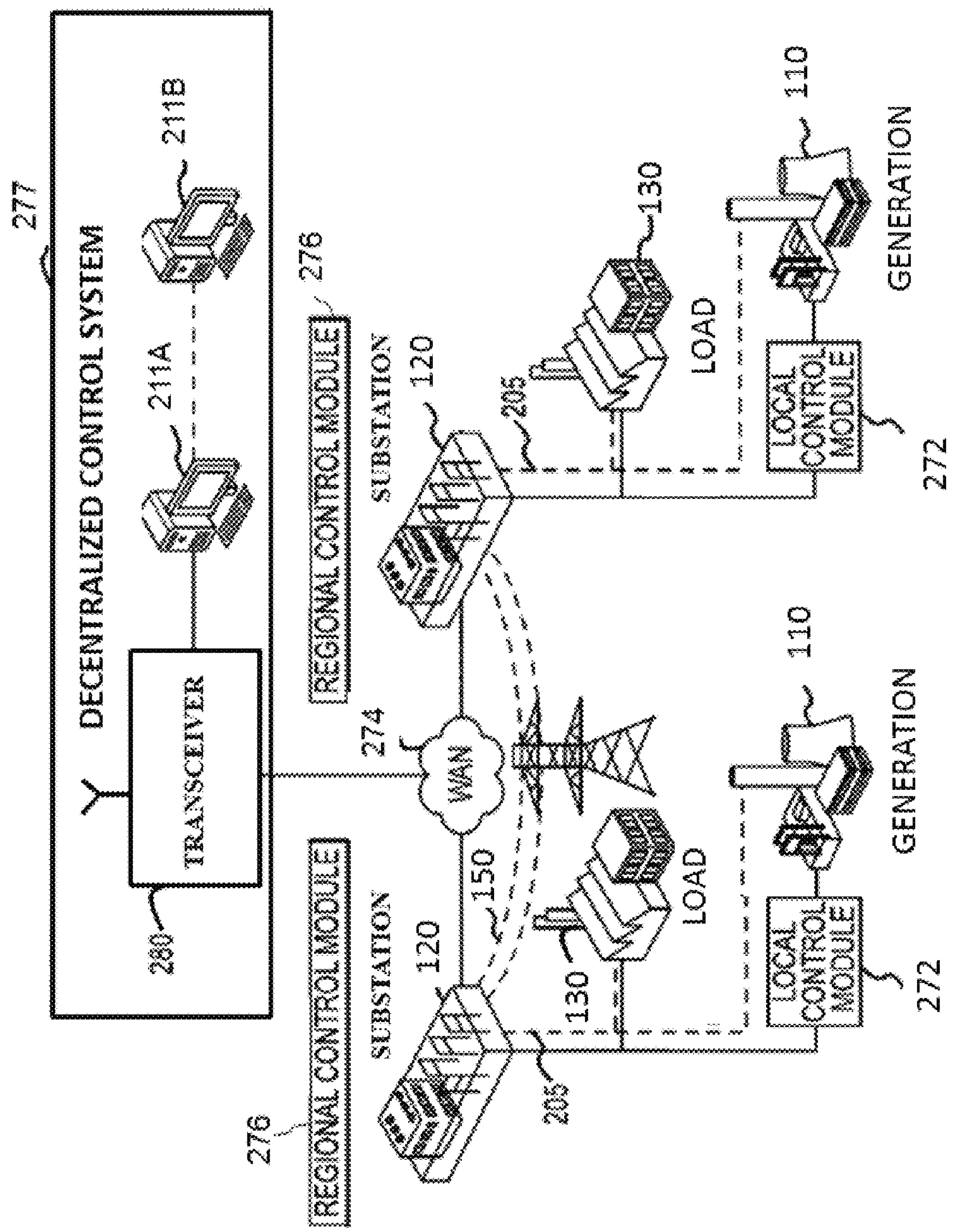
FIG. 2C is a schematic of an exemplar EPS controlled system, according to some embodiments of the present disclosure.

FIG. 2C shows a schematic of an exemplar EPS controlled according to one embodiment of the present disclosure. The power generation facilities 110 are coupled to substations 120. Associated with substations 120 is a regional control module 276. The regional control module manages power production, distribution, and consumption within its region. Also associated with each region are industrial/commercial/residential loads 130 representative of industrial plant or large commercial enterprises or residential loads. According to some embodiments of the disclosure, each regional control module 276 using one or more applications is operable to manage the power production and distribution within its region, and monitoring the healthy and security status of the region of grid under its control.

In some implementations, power producing entity, such as the power generation plants 110, interfaces with the regional grid via a local control module 272. The local control module 272 can standardize control command responses with each of the plurality of power providers. By offering to the regional control module 276 a standardized response from each of the plurality of power producing entities, the regional control module can actively manage the power grid in a scalable manner. The regional control module 276 is further aware of the electricity producing capacity within the region and the limitations to the power grid. The regional control module 276 understands topology with respect to the power providers and power consumers and its own ability to distribute the power.

Each regional control module 276 is communicatively coupled to a control system 277 via, e.g., a wide area network 274. The wide area network can be the Internet or other means to communicate data among remote locations. Additionally, or alternatively, the data can be exchanged between the control system 277 and the regional control modules 276 via a local area network or Intranet. To that end, the control system 277 includes a transceiver 280 for exchanging data between the control system and regional control modules 276 via the network 274. Also, control system 277 includes one or several processors 211A and 211B to balance amounts of electricity passing through an electrical grid.

The control system 277 is operable to manage the interaction of several regional control modules 276 and the power providers under their control. As previously described, each regional control module 276 using applicable applications can dynamically manage the power consumers and power providers within its control. As demand within a certain region managed by a regional control module 276 increases or decreases, the regional control module 276 needs to act to compensate for power production within a particular region. To that end, the regional control module 276 makes a decision about supplying or requesting the electricity from the grid. The control system

277 receives, transmits or retransmits such request to balance amount of electricity going in or off the grid.

Different embodiments of the disclosure monitor one or combination of the voltage phase angles on the buses of the EPS and/or the rotor frequencies of generators in the EPS. For example, one embodiment determines anomalies from the updated states of the EPS, and then the control system 277 can issue a command to the regional control module 276 to control their production or loads or network topology accordingly. For example, the regional control module 276 can issue a command to a local control module 272 of a generation facility 110 to block its automatic generation control to avoid executing incorrect load flowing function, when an anomaly 15 found.

Structure-Preserving Model

Consider a power system that includes a set of {1, 2, . . . , n} buses and a set of transmission lines connecting between the buses. Let the subset of buses with generators be denoted G with $|G|=n_g$. Let the subset of buses with loads be denoted D with $|D|=n_d$, and $n_g+n_d=n$.

Assumed that the transient voltage behind its internal reactance of a generator at bus i, $i\in G$ is constant, then the dynamics of the generator can be described as:

$$\dot{\delta}_i(t) = \omega_i(t), \tag{1}$$

$$M_i\dot{\omega}_i(t) = P_i^G(t) - \frac{E_iV_i}{Z_i}\sin(\delta_i(t)-\theta_i(t)) - D_i\omega_i(t),$$

where $E_i$ and $\delta_i$ are the internal voltage magnitude and the rotor angle of generator at bus i, $M_i$, $D_1$ and $Z_i$ are the inertia, the damping coefficient and the transient reactance of generator at bus i, $V_i$ and $\theta_i$ are the voltage magnitude and the phase angle of bus i, $P_i^G$ is the equivalent power injections of mechanical power input of generator at bus i.

The power flow equation at generator bus i, $i\in G$ is as follows:

$$P_i^D = \frac{E_iV_i}{Z_i}\sin(\theta_i-\delta_i) + \sum_{j=1}^{n} V_iV_jY_{ij}^B\sin(\theta_i-\theta_j) + \sum_{j=1}^{n} V_iY_jY_{ij}^G\cos(\theta_i-\theta_j), \tag{2}$$

$$Q_i^D = \frac{1}{Z_i}V_i^2 - \frac{E_iV_i}{Z_i}\cos(\theta_i-\delta_i) + \sum_{j=1}^{n} V_iV_jY_{ij}^G\sin(\theta_i-\theta_j) - \sum_{j=1}^{n} V_iV_iY_{ij}^B\cos(\theta_i-\theta_j),$$

where, $P_i^D$ and $Q_i^D$ are the equivalent active and reactive power injections for power demands of generator bus i, $Y_{ij}^G$ and $Y_{ij}^B$ are the elements of bus conductance matrix and bus susceptance matrix at the row corresponding to bus i and the column corresponding to bus j.

Analogously, for any load bus i, $i\in D$ (i.e. $i\notin G$), the power flow equation at the bus is $$P_i^D = \sum_{j=1}^{n} V_iV_jY_{ij}^B\sin(\theta_i-\theta_j) + \sum_{j=1}^{n} V_iV_jY_{ij}^G\cos(\theta_i-\theta_j), \tag{3}$$

$$Q_i^D = \sum_{j=1}^{n} V_iV_jY_{ij}^G\sin(\theta_i-\theta_j) - \sum_{j=1}^{n} V_iV_jY_{ij}^B\cos(\theta_i-\theta_j),$$

It can be assumed for a practical power system that all angular differences for each generator and line are small, the resistance at each transmission lines is ignorable, and the voltage at each generator or generator is close to its nominal rated value, and therefore we can have: $\sin(\delta_i-\theta_i)\approx\delta_i-\theta_i$, $\cos(\delta_i-\theta_i)\approx1$, $\sin(\theta_i-\theta_j)\approx\theta_i-\theta_j$, $\cos(\theta_i-\theta_j)\approx1$, $Y_{ij}^G=0$ and $E_i=V_i=1$ per unit. With these assumptions, the equations (1)-(3) can be linearized around the network steady state condition to yield following the dynamic linearized swing equation and the algebraic DC power flow equation:

$$\dot{\delta}_i(t) = \omega_i(t),\ i\in G \tag{4}$$

$$M_i\dot{\omega}_i(t) = -\frac{1}{Z_i}\delta_i(t) - D_i\omega_i(t) + \frac{1}{Z_i}\theta_i(t) + P_i^G(t),\ i\in G$$

$$0 = \frac{1}{Z_i}\delta_i(t) - \frac{1}{Z_i}\theta_i(t) - \sum_{j=1}^{n} Y_{ij}^B(\theta_i(t)-\theta_j(t)) + P_i^D(t),\ i\in G$$

$$0 = -\sum_{j=1}^{n} Y_{ij}^B(\theta_i(t)-\theta_j(t)) + P_i^D(t),\ i\notin G,$$

Equation (4) is usually called as the linearized structure-preserving model. It can be also expressed in compact form as:

$$\begin{bmatrix} I & 0 & 0 \\ 0 & M^{INER} & 0 \\ 0 & 0 & 0 \end{bmatrix}\dot{X}(t) = -\begin{bmatrix} 0 & -I & 0 \\ L^{GG} & D^{DAMP} & L^{GD} \\ L^{DG} & 0 & L^{DD} \end{bmatrix}X(t) + [\,0^T \quad P^G(t) \quad P^D(t)\,]^T, \tag{5}$$

where $M^{INER}$ and $D^{DAMP}$ are diagonal matrices, $M_{ii}^{INER}=M_i$, $D_{ii}^{DAMP}=D_i$; $P^G(t)=[P_1^G(t), \ldots, P_{n_g}^G(t)]$, and $P^D(t)=[P_1^D(t), \ldots, P_n^D(t)]$. The state $x(t)=[\delta(t)^T\ \omega(t)^T\ \theta(t)^T]$ consists of the rotor angle δ and rotor frequency ω at every generator and the voltage phase angle θ at every bus. The matrix $$L = \begin{bmatrix} L^{GG} & L^{GD} \\ L^{DG} & L^{DD} \end{bmatrix}$$

is a Laplacian matrix with a sparsity structure related to the underlying network. We note that $L^{GG}$ is a diagonal matrix, $$L_{ii}^{GG} = \frac{1}{Z_i},$$

$L^{DD}$ is related to the bus susceptance matrix, $$L_{ii}^{DD} = \begin{cases} \sum_{j=1, j\neq i}^{n} Y_{ij}^B + \frac{1}{Z_i}, & i\in G \\ \sum_{j=1, j\neq i}^{n} Y_{ij}^B, & i\notin G \end{cases},\ L_{ij}^{DD} = -Y_{ij}^B$$

and $$L^{GD} = (L^{DG})^T,\ L_{ij}^{GD} = \begin{cases} -\frac{1}{Z_i} & j = i,\ i \in G \\ 0 & \text{otherwise} \end{cases}.$$

The control input $U(t)=[0^T\ P^G(t)\ P^D(t)]^T$ is given by the mechanical power input at the generators, $P^G$, and the electrical power demand at each bus, $P^D$, including those connected to a generator.

For a practical application, there exist both process and measurement noise. Additionally, the measurements are taken to be a discrete-time process rather than a continuous time process, which is more realistic for digitally sampled systems. The process noise v(t) and measurement noise n[k] are assumed to be Gaussian noise processes. With the introduction of noise, we cannot apply a deterministic filter for attack detection. For the noisy setting, we appeal to Kalman filtering techniques. However, since the dynamic system matrix in (5) is a singular matrix, the dynamic model in (5) is not directly applicable for Kalman filtering. One solution is to eliminate θ from the state dynamics through the equation $$\theta(t)=(L^{DD})^{-1}(P^D(t)-L^{DG}\delta(t)). \quad (6)$$

Although $L^{DD}$ is sparse, its inverse is not, which leads to a coupling of the dynamics for ω(t) amongst all generators that is not present in the original formulation (5). Such a global coupling makes developing a distributed solution with reasonable communication requirements infeasible.

Dynamic Model

To solve the problem described above, we treat the bus voltage phase angle as a control input rather than eliminating it from the dynamics. The state given by the generator variables can be described as:

$$x(t)=[x_1(t)x_2(t)\ \ldots\ x_{n_g}(t)]^T, \quad (7)$$

$$x_i(t)[\delta_i(t)\omega_i(t)]^T. \quad (8)$$

The dynamics for the generator can be described as follows:

$$\dot{\delta}_i(t) = \omega_i(t) + v_{\delta_i}(t), \quad (9)$$

$$\dot{\omega}_i(t) = \frac{-1}{M_iZ_i}\delta_i(t) - \frac{D_i}{M_i}\omega_i(t) + \frac{1}{M_i}\left(P_i^G(t) + \frac{1}{Z_i}\theta_i(t)\right) + v_{\omega_i}(t), \quad (10)$$

where $v_{\delta_i}(t)$ and $v_{\omega_i}(t)$ are the process noises on $\delta_i$ and $\omega_i$, respectively. Therefore, these equations can be collected in matrix-form:

$$\dot{x}(t)=\overline{A}x(t)+u(t)+v(t), \quad (11)$$

where $\overline{A}$ is block diagonal, and its non-zero entries are set as:

$$\overline{A}(\dot{\delta}_i(t), \omega_i(t)) = 1.0,$$

$$\overline{A}(\dot{\omega}_i(t), \delta_i(t)) = \frac{-1}{M_iZ_i},$$

$$\overline{A}(\dot{\omega}_i(t), \omega_i(t)) = -\frac{D_i}{M_i}.$$

The control input is $$u(t) = \lfloor u_{\delta_1}(t)\ \ u_{\omega_1(t)}\ \ \ldots\ \ u_{\delta_{n_g}}(t)\ \ u_{\omega_{n_g}}(t) \rfloor. \quad (12)$$

$$u_{\delta_i}(t) = 0,$$

$$u_{\omega_i}(t) = \frac{1}{M_i}\left(P_i^G(t) + \frac{1}{Z_i}\theta_i(t)\right). \quad (13)$$

The process noise is assumed to be $v(t)\sim N(0,\overline{Q})$ and uncorrelated in time. After digital sampling with sampling period $\overline{T}$, the continuous-time dynamic system is converted to a discrete-time system:

$$x[k+1]=Ax[k]+Bu[k]+v[k], \quad (14)$$

where $$A=e^{\overline{TA}},$$

$$B = \int_0^T e^{\tau\overline{A}}d\tau, \quad (15)$$

and $v[k]\sim N(0,Q)$. The sampled process noise covariance matrix Q is related to the un-sampled covariance matrix $\overline{Q}$ via $$Q = \int_0^T e^{\overline{A}\tau}\overline{Q}e^{\overline{A}^T\tau}d\tau. \quad (16)$$

To evaluate the integrals in (15)-(16), we use a second-order approximation:

$$A \approx I + \overline{TA} + \frac{\overline{T}^2}{2!}\overline{A}^2,$$

$$B \approx \overline{T}I + \frac{\overline{T}^2}{2!}\overline{A},$$

$$Q \approx \overline{TQ} + \frac{\overline{T}^2}{2!}(\overline{AQ} + \overline{QA}^T).$$

The voltage phase angles are usually measured by a Phasor Measurement Unit (PMU). Since the sampling rate of the PMUs is high enough to track the system dynamics, we assume the second-order approximation is accurate.

Measurement Model

The measurements used in this present disclosure include the measurements of the generator rotor frequencies ω, and the measurements of the bus voltage phase angles θ. Similar to the dynamics, using θ directly in the measurement equations yields the following measurement model:

$$\hat{\omega}_i[k]=\omega_i[k]+n_{\omega_i}[k], \quad (17)$$

$$\hat{\theta}_i^k=[-(L^{DD})^{-1}L^{DG}]\delta[k](L^{DD})_i^{-1}P^D[k]+n_{\theta_i}[k], \quad (18)$$

where, $P^D[k]$ is a known input. This formulation is not desirable for distributed processing since $(L^{DD})^{-1}$ couples the measurement of the phase angle $\hat{\theta}$ at any given bus to the rotor angle δ at all generators and the electrical power demand $P^D$ at all buses. We handle this by instead considering measurement of $$\hat{\theta}_i^*[k]\stackrel{\Delta}{=}L_i^{DD}\hat{\theta}[k]-P_i^D[k] \quad (19)$$

The relation to the state is:

$$\theta_i^*[k] = \frac{1}{Z_i}\delta_i[k] + n_{\theta_i^*}[k] \quad (20)$$

where $v_{\theta_i*}[k]$ is the measurement noise.

Let $y[k]=[y_1[k] \ldots y_n[k]]^T$, where $y_i[k]$ is the measurement set local to bus i, and defined as:

$$y_i[k] = \begin{cases} [\hat{\omega}_i[k] \quad \hat{\theta}_i^*[k]] & i \in G \\ \hat{\theta}_i^*[k] & i \notin G \end{cases}, \quad (21)$$

We can have the following decoupled measurement model:

$$y[k]=Hx[k]+n[k].$$

The measurement matrix, H can be decoupled (i.e. block diagonal), since the measurements $y_i$ involve only local variables $\omega_i$ and $\delta_i$ as shown in equations (17) and (20). The non-zero elements for the measurement matrix H are: $H(\hat{\omega}_i, \omega_i)=1.0$, $i \in G$ and $$H(\hat{\theta}_i^*, \delta_i) = \frac{1}{Z_i}, \; i \in G.$$

This new formulation maintains the original sparse, localized coupling inherent to power systems rather than a global coupling. The quantity $\theta_i^*$ in (19) is a linear combination of voltage phase angles at neighboring buses and thus can be calculated in a distributed fashion with limited communication, since $L_i^{DD}$ only have non-zero element for the entry corresponding to the buses that have direct connection with bus i. Furthermore, only the local electric power demand $P_i^D$ is needed at each bus rather than the global $P^D$.

However, measurement of $\theta^*$ introduces the following complication. The measurement noise is Gaussian with $n_\omega \sim (0, R_\omega)$ and $n_\theta \sim N(0, R_\theta)$, where $R_\omega$ and $R_\theta$ are assumed to be diagonal. However, $R_{\theta*}=L^{DD}R_\theta(L^{DD})^T$ is not diagonal. $R_{\theta*}$ introduces coupling and communication requirements that depend on neighboring rather than global information. The sparsity pattern of $L^{DD}$ is the same as the adjacency matrix of the underlying network. The matrix $L_{ij}^{DD}$ is nonzero if and only if bus i and bus j are neighbors, and $[L^{DD}R_\theta(L^{DD})^T]_{ij}$ is nonzero if and only bus i and bus j are at most 2-hop neighbors. In summary, we have a new formulation that transfers all of the coupling to the measurement covariance matrices and process-measurement covariance.

Kalman Filtering with Correlated Process and Measurement Noise

Due to the presence of θ as a control input in (13) and in the measurements in (19), the process noise v[k] is correlated with the measurement noise n[k+1]. Let $$E\{v[k]n[j]^T\} \stackrel{def}{=} C\delta_{j,k+1}, \quad (22)$$

where δ is the Kronecker delta, that is δ is 1 if j equals to (k+1), and 0 otherwise. Before discretization the control input to $\delta_i$ is zero, and the control input to $\omega_i$ depends only on $\theta_i$. After discretization, the matrix B in (15) is block-diagonal introducing a coupling between $\mu_{\delta_i}$ and $\theta_i$. Therefore, we specify C to have non-zero entries only at:

$$C(\mu_{\delta_i}, \hat{\theta}_j^*) \text{ if } j=i \text{ or } j \in N_i$$

$$C(\mu_{\omega_i}, \hat{\theta}_j^*) \text{ if } j=i \text{ or } j \in N_i.$$

$N_i$ is the set of 1-hop neighboring buses of bus i.

The Kalman gain and state covariance estimation update formulas with process and measurement noise correlated according to C are given below:

$$\hat{x}^-[k]=A\hat{x}^+[k-1]+Bu[k-1], \quad (23)$$

$$P^-[k]=AP^+[k-1]A^T+Q. \quad (24)$$

$$\hat{x}^+[k]=\hat{x}^-[k]+K[k](y[k]-H\hat{x}^-[k]), \quad (25)$$

$$S[k]=HP^-[k]H^T+HC+C^TH^T+R, \quad (26)$$

$$K[k]=(P^-[k]H^T+C)S[k]^{-1}, \quad (27)$$

$$P^+[k]=P^+[k]-K[k](HP^-[k]+C^T). \quad (28)$$

Equations (23) and (24) represent the dynamic update step, in which the estimated state, $\hat{x}^+[k-1]$, and estimated covariance, $P^+[k-1]$, are updated according to the system dynamics.

Equations (25)-(28) represent the measurement update step, in which the predicted state estimate, $\hat{x}^-[k]$, and the predicted covariance estimate, $P^-[k]$, are updated with the measurements to produce the current estimate, $\hat{x}^+[k]$ and $P^+[k]$.

Cyber-Physical Attack Model and Detection

The vectors $f_1$ and $f_2$ are introduced into state space model to represent additive state and measurement anomaly, or attack vectors, respectively:

$$x[k+1]=Ax[k]+Bu[k]+v[k]+f_1[k], \quad (29)$$

$$y[k]=Hx[k]+n[k]+f_2[k]. \quad (30)$$

In terms of hypothesis testing, the aim of the present disclosure is to distinguish between $H_0$ (No Attack, or Anomaly): $\forall k, f_1[k]=0, f_2[k]=0$ $H_1$ (Attack, or Anomaly): There exist $\{k^*\}$ for which $$f_1[k^*]\neq 0, f_2[k^*]\neq 0. \quad (31)$$

Bad data from a faulty sensor can be viewed as one particular attack, or anomaly in this framework.

Our criterion for detecting attacks or anomalies is a statistic based on the output of the dynamic state estimation. It is assumed that the attack, or anomaly vectors $f_1$ and $f_2$ in Equations (29)-(30) are unknown. A sliding window attack statistic is proposed based on the measurement residual. The global attack statistic at time k is defined as follows:

$$d[k] = \sum_{j=k-w+1}^{k} \gamma^T[j]S^{-1}[k]\gamma[j], \quad (32)$$

where the sliding window is of length w and m is the number of measurements. The measurement residual, i.e. Kalman innovation, is a zero mean Gaussian random variable, and the statistic $d[k] \sim \chi^2(wm)$ is a chi-squared random variable with wm degrees of freedom. This is due to the fact that the covariance matrix of global innovation $\gamma[k]$ is equal to S[k].

This fact can be proven as follows: the global innovations covariance matrix can be defined as:

$$E[\gamma[k]\gamma^T[k]]=E\lfloor(y[k]-H\hat{x}^-[k])(y[k]-H\hat{x}^-[k])^T\rfloor \quad (33a)$$

$$=E\{[H(x[k]-\hat{x}^-[k])+n[k]][H(x[k]-\hat{x}^-[k])+n[k]]^T\} \quad (33b)$$

$$=HP^-[k]H^T+R+E[H(x[k]-\hat{x}^-[k])n^T[k]]+E\lfloor n[k](x[k]-\hat{x}^-[k])^TH^T\rfloor. \quad (33c)$$

From equation (23) we have that $$x[k]-\hat{x}^-[k]=(Ax[k-1]+Bu[k-1]+v[k-1])-(A\hat{x}^+[k-1]+Bu[k-1]) \quad (34a)$$

$$=A(x[k-1]-\hat{x}^+[k-1])+v[k-1], \quad (34b)$$

$$E[(x[k]-\hat{x}^-[k]n^T[k]]=E[A(x[k-1]-\hat{x}^+[k-1])n^T[k]]+E[v[k-1]n^T[k]]=C, \quad (35)$$

where the last line follows from the fact measurement noise at time k is uncorrelated with the measurements and state at the previous time step. Plugging into (33c), the desired result can be obtained as:

$$E[\gamma[k]\gamma^T[k]]=HP^-[k]H^T+R+HC+C^TH^T=S[k] \quad (36)$$

Distributed Implantation of Estimation and Online Attack Detection

According to embodiments of the present disclosure, the attack detection is implemented jointly with distributed dynamic state estimation. The distributed and dynamic nature of the invented method facilitates detecting attacks in an online fashion as new measurements become available, making this particularly attractive for monitoring the health of critical cyber-physical systems, such as power grids. In addition to eliminating the need for communication with a centralized control center, each control area is solved as a problem of reduced dimension with respect to the original global problem. In this aim, local states and local measurements are used for each control area.

As shown in Equation (27), the Kalman filtering needs an inversion for the innovations covariance matrix S[k]. In order to achieve distributed implementation of dynamic state estimation, it is solved using an iterative (distributed) inversion method instead of a direct (centralized) inversion method. To avoid using full communication scheme that is all generators communicate with each other, a proximity-based limited communication scheme, i.e. l-hop communication is used. That is only generators at most l-hops away communicate with each other. The parameter l is a predetermined neighborhood distance.

Distributed Dynamic State Estimation

The present disclosure uses a criterion for detecting attacks that is a statistic based on the output of dynamic state estimation. Dynamic state estimation is distributed solved for each control area using local state and measurement models and limited communications with adjacent control areas.

Assumed the network buses are partitioned into a set of N control areas. The state local to control area I is the generator rotor angle and frequency at the buses in the control area I, $x_I=[\delta_I\ \omega_I]^T$. There is no overlap between states of neighboring areas.

The measurements local to control area I, $y_I$ are the frequencies of all generators contained in the control area and the weighted phase angles $\theta_I$* at buses contained in the control area. Based on the characteristics of matrix $L^{DD}$, the $\theta_I$* for the border buses of control area I depends on measurements of phase angles at neighboring buses at neighboring control areas, so control area I needs exchanging the measurements of neighboring buses with their neighboring control areas.

One remarkable feature of the Kalman filter is that the estimated covariance matrices, such as $P^-[k]$, $P^+[k]$ and S[k] do not depend on the measurements. Therefore, they can be computed in advance offline. It is stressed here again that the system dynamics matrix A and measurement matrix H are both decoupled (i.e. no mixing is introduced between states in different areas). Assuming buses are labeled consecutively across control areas, therefore the state-space model can be written as:

$$[k],y_I[k]=H_Ix_I[k]+n_I[k]I=\{1,2,\ldots N\}. \quad (37)$$

Since the power network is an interconnected system, it can expect that a need to exchange information between control areas. Indeed, this need is reflected in the fact that the Kalman gain K[k] is not a block-diagonal matrix. The innovation, or measurement residual, for control area I is defined as:

$$\gamma_I[k]=y_I[k]-H_I\hat{x}_I^-[k]. \quad (38)$$

The measurement update to the local estimate is then $$\hat{x}_I^-[k]=\hat{x}_I^-[k]+K_I[K]\gamma[k], \quad (39)$$

where $K_I[k]$ are the rows of K[k] corresponding to control area I. Since K[k] is not a block-diagonal matrix, control area I needs to communicate the entries of γ[k] with adjacent control areas to update its local estimate $\hat{x}_I^+[k]$. Because the formula for K[k] in (27), $K[k]=(P^-[k]^T+C)S^{-1}[k]$ contains a matrix inversion, $S[k]^{-1}$, it is difficult to calculate in a distributed way if a direct inversion method is used. Instead, the present disclosure uses an iterative inversion method to achieve distributed implementation for dynamic state estimation.

Consider the linear system $$S[k]\beta[k]=\gamma[k], \quad (40)$$

Then, the measurement update in (39) is given as $$\hat{x}_I^+[k]=\hat{x}_I^-[k]+(P^-[k]H^T+C)_I\beta[k] \quad (41)$$

The key to dealing with the inverse in a distributed way is to iteratively solve (40) for μ[k] without explicitly calculating the inverse and use the result in (41). The present disclosure uses the damped Jacobi method to achieve a fully distributed solution to (40).

The matrix S[k] can be decomposed into the difference of a diagonal matrix, $S^D[k]$ and a matrix containing the remaining off-diagonal entries, $S^E[k]$:

$$S[k]=S^D[k]-S^E[k]. \quad (42)$$

Iteratively solving for β[k] using the damped Jacobi method amounts to finding the fixed point of $$\beta^{I+1}[k]=\beta^I[k]+\alpha(S^D[k])^{-1}(\gamma[k]-S[k]\beta^I[k]), \quad (43)$$

where α is the damping parameter. Since $S^D[k]$ is diagonal, its inverse $(S^D[k])^{-1}$ is diagonal, and each block can be computed locally. The sparsity of S[k] determines the entries from $\beta^I[k]$ that need to be communicated with neighboring areas.

The damped Jacobi method in (43) can be proven to converge if the damping factor is selected according to $$\alpha < \min_i \frac{2S_{ii}[k]}{\sum_{j\neq i}|S_{ij}[k]|}.$$

Since S[k] is the covariance matrix for the innovations, it is symmetric and positive semi-definite. Furthermore, by the standard assumptions for Kalman filtering, S[k] is an invertible matrix, thus S[k] positive definite, that is S[k]>0. The damped Jacobi method can be converged if and only $$0 < S[k] < \frac{2}{\alpha} S^D[k].$$

Therefore, a sufficient condition is to choose α so that $$\left(\frac{2}{\alpha} S^D[k] - S[k]\right)$$

is diagonally dominant. Diagonal dominance requires that $$\left[\frac{2}{\alpha} S^D[k] - S[k]\right]_{ii} = \left(\frac{2}{\alpha} - 1\right) S_{ii}[k] > \sum_{j \neq i} \left| \left[\frac{2}{\alpha} S^D[k] - S[k]\right]_{ij} \right| = \sum_{j \neq i} |S_{ij}[k]|, \quad (44)$$

Then we can have:

$$\alpha < \frac{2 S_{ii}[k]}{\sum_{j \neq i} |S_{ij}[k]|} \forall i. \quad (45)$$

The result utilizes the fact that $S_{ii}[k]>0$ since it is the value of a variance.

Since the damped Jacobi method is iterative, an inner-loop of iterations can be introduced for each outer-loop k of the Kalman filter. The number of inner-loop iterations $T_{inner}$ is a tunable parameter that can be chosen to achieve a specified tolerance on the difference between consecutive inner iterations. After completing pre-determined number of iterations, $T_{inner}$, we obtain $\beta^{T_{inner}}$, which is multiplied by $(P^-[k]H^T+C)$ in order to calculate (41). Since $P^-[k]$ is in general a full matrix, in order to avoid communication between all generators, we propose the following masking approximation:

$$\tilde{P}[k] \stackrel{def}{=} N_l \otimes P^-[k]. \quad (46)$$

where $N_l$ is a mask matrix for "l-hop" neighbors, and defined as:

$$[N_l]_{ij} \stackrel{def}{=} \begin{cases} 1, & i, j \text{ are } l\text{-hop neighbors} \\ 0, & \text{Otherwise} \end{cases} \quad (47)$$

Thus, $\tilde{P}_{ij}^-[k]$ is nonzero if and only if the buses corresponding to $x_i$ and $x_j$ are at most l-hops away (e.g., direct neighbors are l-hop neighbors.) By tuning l, there is a tradeoff between accuracy of estimation and communication requirements.

The sparsity of S[k] in (26) determines the entries from $\beta^t[k]$ that need to be communicated with neighboring areas. We analyze the communication requirements of our distributed method in terms of the sparsity patterns of relevant matrices and the l-hop neighbor approximation in (47).

Using (43), $\beta_l$ is iteratively solved, then neighbors need to communicate their entries of the vector β according to the sparsity pattern of S[k]. For l≥2, using a l-hop neighbor mask in (47), the sparsity pattern of S[k] has non-zero entries only at pairs of measurements corresponding to buses that are at most l-hops away. Therefore, at most l-hop neighbor communication is needed for each control area.

This can be proved as follows: The matrix S[k] consists of the sum of four terms. Consider the sparsity pattern of the first item, $H\tilde{P}^-[k]H^T$:

$$\left(H\tilde{P}^-[k]H^T\right)_{ij} = \sum_m H_{im} \sum_l \tilde{P}_{ml}^-[k] H_{jl}. \quad (48)$$

For concreteness, take row i of H to correspond to the measurement $\hat{\theta}_i^*$ and take row j to correspond to the measurement $\hat{\omega}_j$.

$$\left(H\tilde{P}^-[k]H^T\right)_{ij} = \sum_m H_{\theta_i^*,m} \sum_l \tilde{P}_{ml}^-[k] H_{\omega_j,l} \quad (49)$$

$$= \sum_m H_{\theta_i^*,m} \tilde{P}_{m,\omega_j}[k] = H_{\theta_i^*,\delta_i} \tilde{P}_{\delta_i,\omega_j}[k] \quad (50)$$

is nonzero if and only if $\tilde{P}_{\delta_i,\omega_j}$ is not zero. From the definition of l-hop mask in (47), this is equivalent to having bus i and bus j be at most l-hop neighbors. A similar argument follows for the other measurement types. In conclusion, the calculation of $(H\tilde{P}^-[k]H^T)$ requires l-hop neighbor communication. In contrast, without the masking approximation, the estimate of the state covariance matrix $P^-$ is full, and each generator would need to communicate with every other generator. The second item is the measurement noise covariance matrix:

$$R = \begin{bmatrix} R_\omega & 0 \\ 0 & L^{DD} R_\theta (L^{DD})^T \end{bmatrix}, \quad (51)$$

where $R_\omega$ and $R_\theta$ are assumed to be diagonal. The entry $L_{ij}^{DD}$ is nonzero if and only bus i and bus j are 1-hop neighbors, and $[L^{DD}R_\theta(L^{DD})^T]_{ij}$ is nonzero if and only bus i and bus j are at most 2-hop neighbors. Therefore, R requires at most 2-hop neighbor communication. The third and fourth items are related to analyze the matrix HC. The entry $[HC]_{ij}$ is nonzero if and only if the states that measurement i depends upon have overlap with the control inputs correlated to measurement j. Measurement i can either be $\hat{\omega}$, or $\hat{\theta}_i^*$ which depends on $\omega_i$ or $\theta_i$, respectively. From (51), a measurement of $\omega_j$ is not correlated to the control inputs, so $[HC]_{ij}$ is zero for columns j corresponding to measurements of ω. Measurements of $\theta_i^*$ are correlated with the control input at bus i and its 1-hop neighboring buses. Therefore, HC only requires neighbor-to-neighbor communication. The same argument holds for $C^TH^T$. In summary, at most l-hop neighbor communication is needed due to calculation of $(H\tilde{P}^-[k]H^T)$.

For Equation (41), there are additional communication requirements for calculating $(\tilde{P}^-[k]H^T+C)$ of the method, after calculating β. The sparsity of $P^-H^T$ is such that the columns corresponding to measurements of $\hat{\theta}^*$ at a load bus are zero. In order to calculate the entry of vector $\lfloor P^{-1}[k] H^T\beta \rfloor$ corresponding to measurement $\hat{\omega}_i$ the entries of β corresponding to the measurements of ω and θ* at all other generators are needed. If an l-hop neighbor mask is applied, then only the entries of β corresponding to measurements at generators at most l-hops away are needed. In summary, to approximately calculate local entries of the vector $[P^{-1}[k] H^T+C]\beta$, areas must communicate local entries of β with at most their l-hop neighbors.

Distributed Attack Detection

During the dynamic state estimation, the quantity $\beta_I[j]=[S^{-1}[k]\gamma[j]]_I$ is calculated locally in each control area I. Therefore no additional communication is required to calculate the local attack statistic $$d_I[k] = \sum_{j=k-w+1}^{k} \gamma_I^T[j]\beta_I[j]. \tag{52}$$

If one had access to the global detection statistic, a classic chi-squared detection test could be used. For real-time attack detection in large networks, it is not feasible to collect $$\sum_I d_I[k]$$

over all areas. Instead, the present disclosure proposes that each area base its attack detection on its local attack statistic information. If $S^{-1}[k]$ were block diagonal, then $d_I[k]$ would be distributed as a chi-squared random variable with $wm_I$ degrees of freedom, where $m_I$ is the number of measurements in area I. However, in general $S^{-1}[k]$ is a full matrix, and $d_I[k]$ does not have an easily characterized distribution. Instead, this invent compares the real-time local attack statistic with an analytical mean and variance of $d_I[k]$ under hypothesis $H_0$ (No Attack) and sliding window w=1 to determine the possible cyber-attack. Using w=1, the mean and variance of the local attack statistic without an attack can be quantified as follows:

$$E[d_I[k]] = \sum_{i\in I}\sum_{l=1}^{n} S_{il}^{-1}[k]S_{il}[k], \tag{53a}$$

$$\text{var}[d_I[k]] = E[d_I^2[k]] - (E[d_I[k]])^2, \tag{53b}$$

where $$E[d_I^2[k]] = \sum_{i,j\in I}\sum_{l,m=1}^{n} S_{il}^{-1}[k]S_{jm}^{-1}[k](S_{il}[k]S_{jm}[k] + S_{ij}[k]S_{lm}[k] + S_{im}[k]S_{lj}[k]). \tag{53c}$$

Given the analytical value for the variance, a threshold $\tau_I$ is set such that if $|d_I[k]|>\tau_I(\text{var}[d_I[k]])|$ an attack is declared. For example, the threshold can be a multiple of $\text{Var}(d_I)$. A nice feature of the invented method is that different false alarm probabilities can be set per area based on the areas' noise characteristics, and extra information about the location is available since the local partial sums of the global attack variable is monitored in the present disclosure.

Procedure for Distributed Estimation and Attack Detection

Figure 3A:
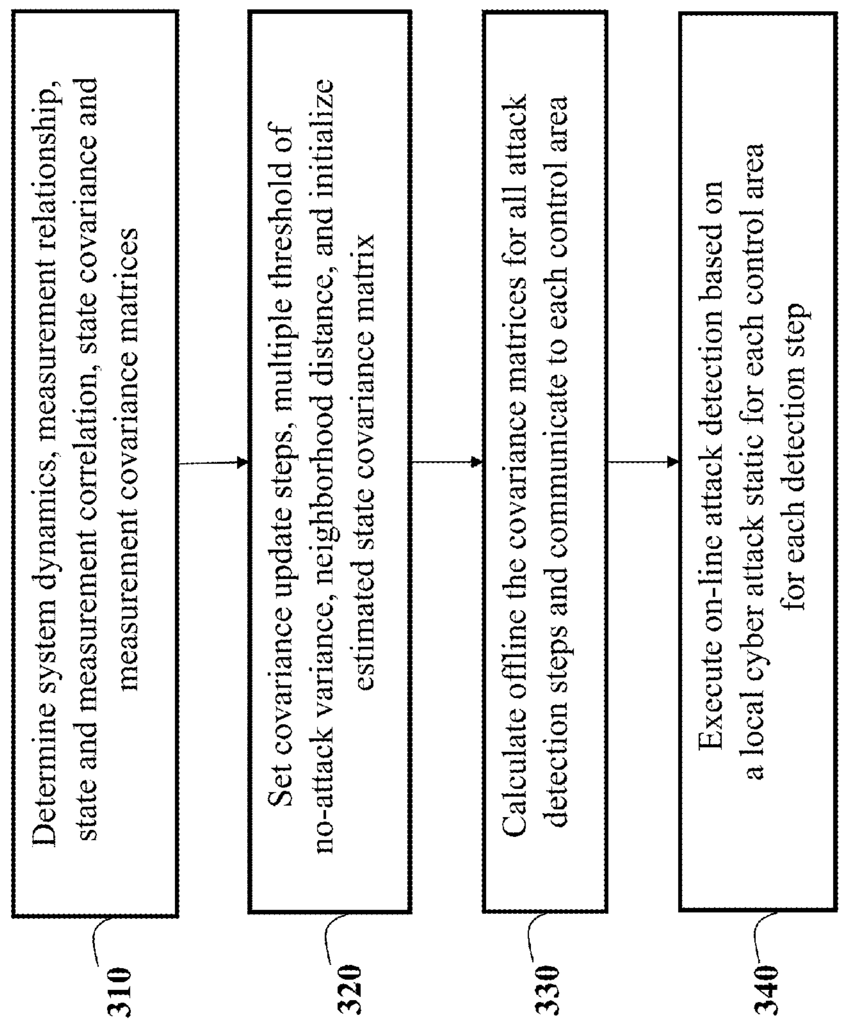
FIG. 3A is a schematic block diagram for distributed estimation and detection of cyber-physical attacks for predetermined period of covariance matrix update, according to some embodiments of the present disclosure.
Figure 3B:
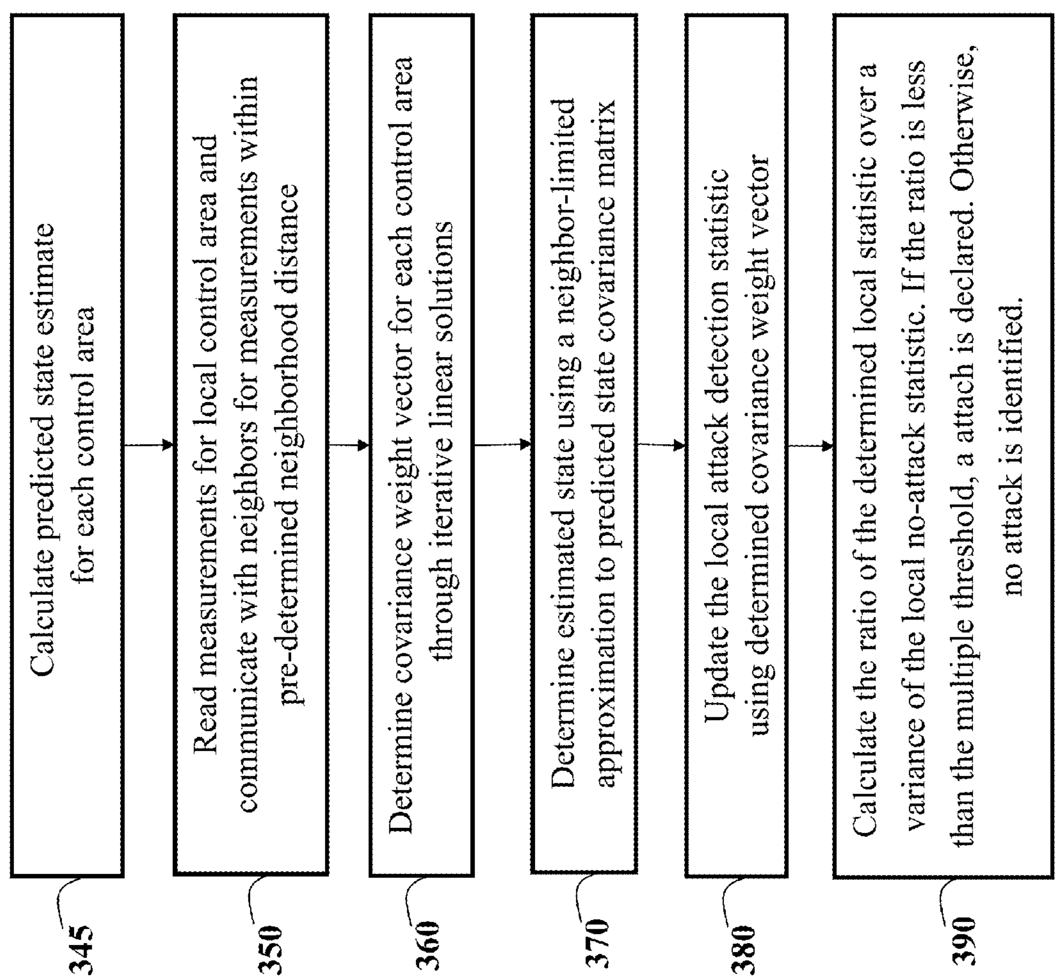
FIG. 3B is a schematic block diagram for determining local area attack statistic and declare possible attack, according to some embodiments of the present disclosure.

FIG. 3A is a schematic block diagram for distributed estimation and detection of cyber-physical attacks for predetermined period of covariance matrix update; and FIG. 3B is a schematic block diagram for determining local area attack statistic and declare possible attack;

In FIG. 3A, the distributed estimation and attack detection of a power system is implemented through the following steps:

Step-310: determine the system dynamics matrix A, measurement relationship matrix H, state and measurement correlation matrix C and state covariance matrix Q and measurement covariance matrix R.

Step-320: Set the total number of time step for covariance update of attack detection K, the threshold number of multiple of no attack variance for each area I, $\tau_I$, predetermined neighborhood distance l, and initialize covariance matrix $P^+[0]$. The threshold $\tau_I$ is set per area based on the areas' noise characteristics, and extra information about the location is available.

Step-330: Calculate offline the covariance matrices, including $\{P^-[k]\}_{k=0}^K$, $\{P^+[k]\}_{k=0}^K$, and $\{S[k]\}_{k=0}^K$, and communicated to each control area according to:

$$P^-[k]=AP^+[k-1]A^T+Q$$

$$S[k]=HP^-[k]H^T+HC+C^TH^T+R$$

$$P^+[k]=P^-[k]-(P^-[k]H^T+C)S^{-1}[k](HP^-[k]+C^T)$$

Step-340: execute on-line attack detection based on a local cyber attack static for each control area for each detection step. Each time step k determines local attack statistic and declare an attack for each area following the steps described in FIG. 3B:

Step-345: Calculate predicted state estimate for each control area I at time step k:

$$x_I^-[k]=A_I\hat{x}_I^+[k-1]+B_Iu_I[k-1]$$

This step does not require any communication since A is block diagonal and $[u]_I$ only depends on local information.

Step-350: Read measurements for local control area and communicate with neighboring areas to get measurements for neighboring buses within 1-hop neighborhood distance in adjacent control areas.

Step-360: Iterate $T_{inner}$ steps to determine covariance weight vector $\beta_I$ for each control area and communicate with its l-hop neighbors of covariance weight vectors during the iterations according to:

$$\beta_I^{t+1}=\beta_I^t+\alpha[S^D[k]]_I^{-1}(\gamma_I-S_{I,I\cup N_I^l}),$$

wherein $N_I^l$ is the set of neighboring buses of buses in the control area I within l-hop neighborhood at adjacent control areas, l is a pre-determined neighborhood distance. $S_{I,I\cup N_I^l}[k]$ is the entries of S[k] at rows corresponding to control area I, and columns corresponding to control area I and its l-hop neighbors, $N_I^l$. $\beta_{\cup N_I^l}$ is the entries of $\beta^t$ corresponding to control area I and its l-hop neighbors, $N_I^l$.

Step-370: Using a neighbor-limited approximation to $P^-[k]$, $\tilde{P}^-[k]$ and communication $\beta_I^{T_{inner}}$ with its l-hop neighbors, each area calculates $$\hat{x}_I^+[k]=\hat{x}_I^-[k]+(\tilde{P}^-[k]H^T+C)_{I,I\cup N_I^l}\beta_{I,I\cup N_I^l}^{T_{inner}}.$$

wherein $\tilde{P}_{ij}^-[k]$ is nonzero and equals to $P_{ij}^-[k]$, if and only if the buses corresponding to $x_i$ and $x_j$ are at most l-hops away. $(\tilde{P}^-[k]H^T+C)_{I,I\cup N_I^l}$ is the entries of $(\tilde{P}^-[k]H^T+C)$ at rows corresponding to control area I, and columns corresponding to control area I and its 1-hop neighbors $M_I^l$.

Step-380: Use $\beta_I$ to update the local attack detection statistic $d_I[k]$:

$$d_I[k] = \sum_{j=k-w+1}^{k} \gamma_I^T[j]\beta_I[j],$$

wherein w is the length of sliding window and set as 1.

Step-390: check if $|d_I[k]|>\tau_I \text{Var}(d_I[k])$. $\text{Var}(d_I[k])$ is a standard variance of the local attack statistic without an attack, and defined according to:

$$\text{var}[d_I[k]] = E[d_I^2[k]] - (E[d_I[k])^2$$

$$E[d_I[k]] = \sum_{i\in I}\sum_{l=1}^{n} S_{il}^{-1}[k]S_{il}[k]$$

$$E[d_I^2[k]] = \sum_{i,j\in I}\sum_{l,m=1}^{n} S_{il}^{-1}[k]S_{jm}^{-1}[k](S_{il}[k]S_{jm}[k] + S_{ij}[k]S_{lm}[k] + S_{im}[k]S_{lj}[k])$$

wherein $S^{-1}[k]$ is the inverse of S[k]. If yes, an attack is declared.

Example

FIG. 4A-4F gives an example for the local attack detection statistic behavior in the system shown in FIG. 1. In each of the six figures of FIG. 4, the histogram of the attack statistic without an attack present and with an attack present is overlaid. Each event in the histogram corresponds to different values for the correlated process and measurement noise. The figures give the attack statistic at three different time steps (before, during, and after the attack) and in two different control areas. The attack is a corruption of the signal reading the power demand at bus 120 in Control Area I in FIG. 1A. The power demand at bus 120 is taken to be multiple times its regular value in the state estimation. The threshold of multiple for no-attack variance $\tau_I$ is 1.

FIG. 4 A-4C show the attack statistics in Control Area I, where the attack takes place. The analytic values for the mean and variance are given using the covariance matrix from our simulations. The vertical line is the analytic mean, and the dashed lines are at plus and minus 1 analytic standard deviation. As shown in the plots, before the attack the histogram for $d_I$ matches exactly with or without an attack. At the time step where the attack occurs, the variance of the statistic $d_I$ is increased with respect to the case when no attack is present.

Figure 4A:
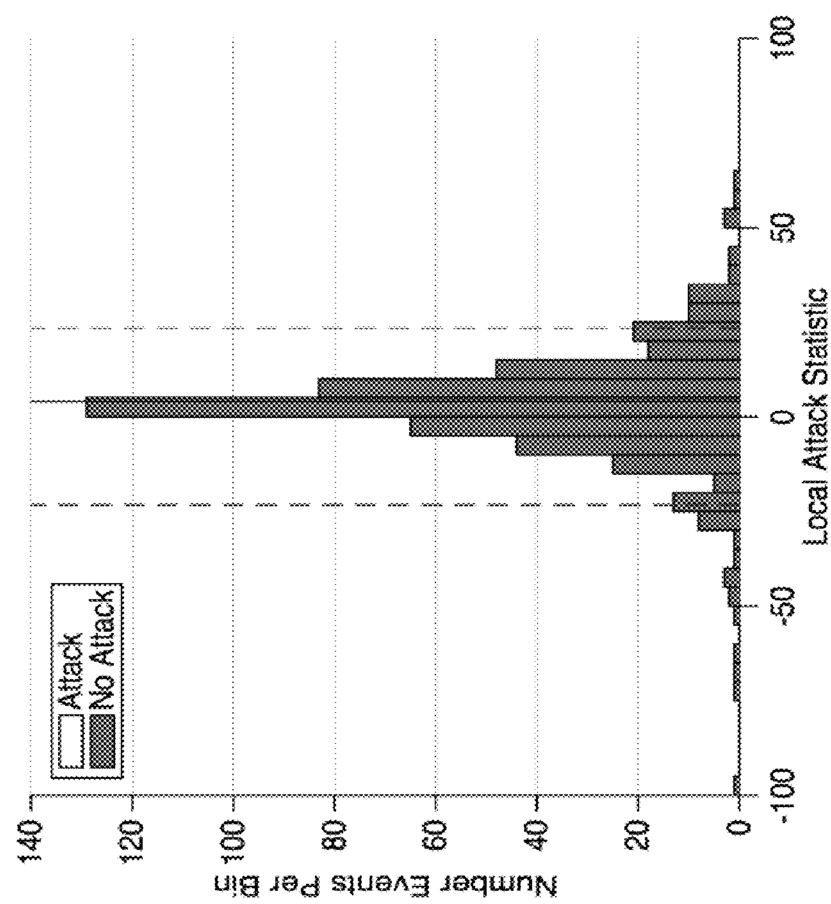
FIG. 4A is a schematic histogram of the local attack statistic for Area I, $d_I$ before attack at area I, according to some embodiments of the present disclosure.
Figure 4B:
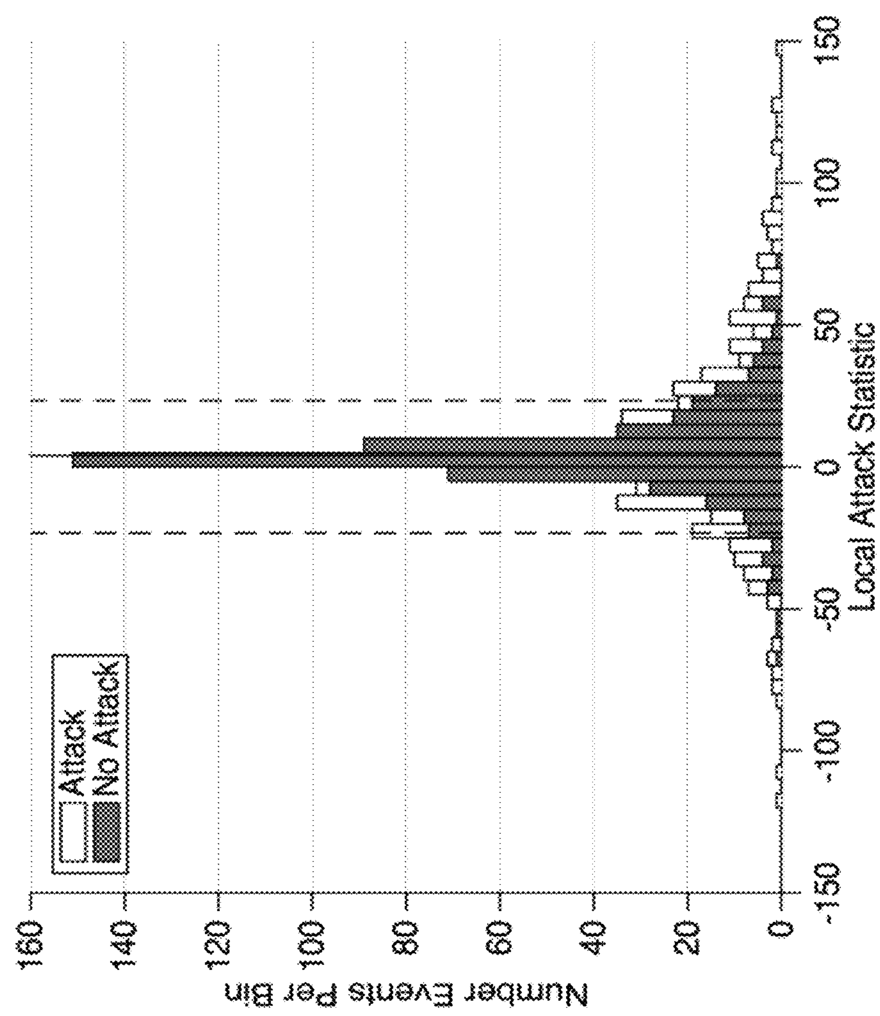
FIG. 4B is a schematic histogram of the local attack statistic for Area I, $d_I$ during attack at area I, according to some embodiments of the present disclosure.
Figure 4C:
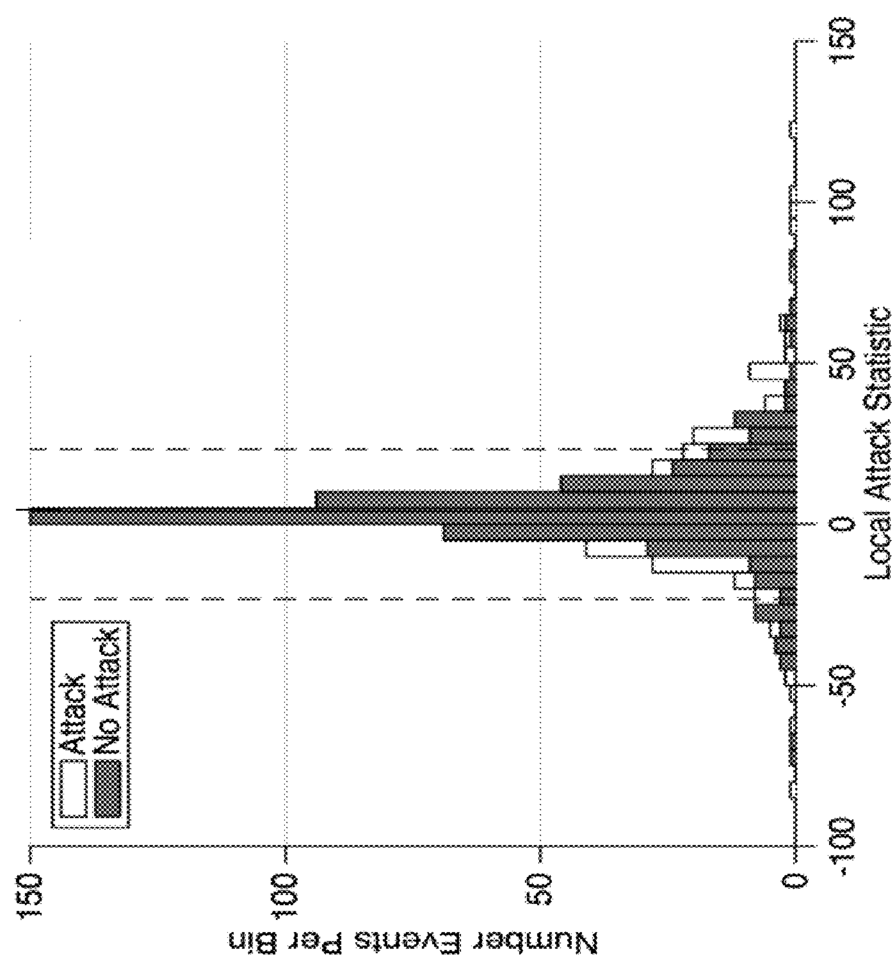
FIG. 4C is a schematic histogram of the local attack statistic for Area I, $d_I$ after attack at area I, according to some embodiments of the present disclosure.
Figure 4D:
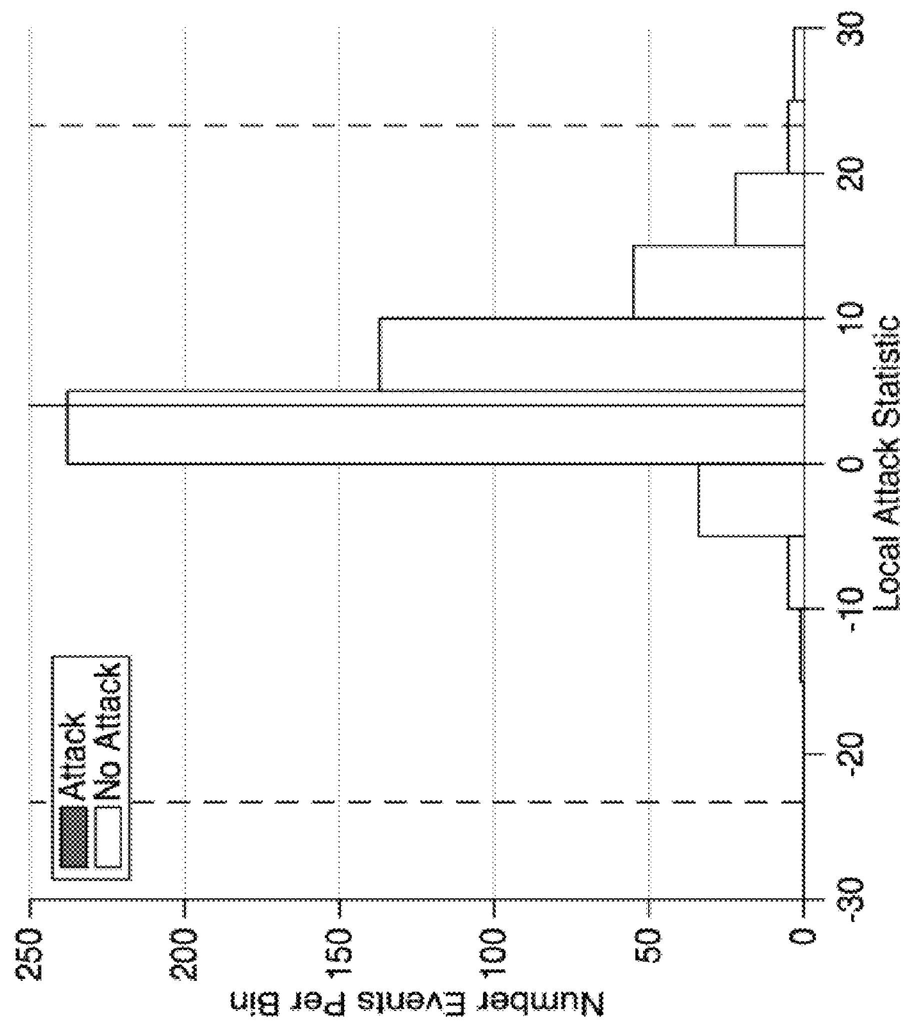
FIG. 4D is a schematic histogram of the local attack statistic for Area IV, $d_{IV}$ before attack at area I, according to some embodiments of the present disclosure.
Figure 4E:
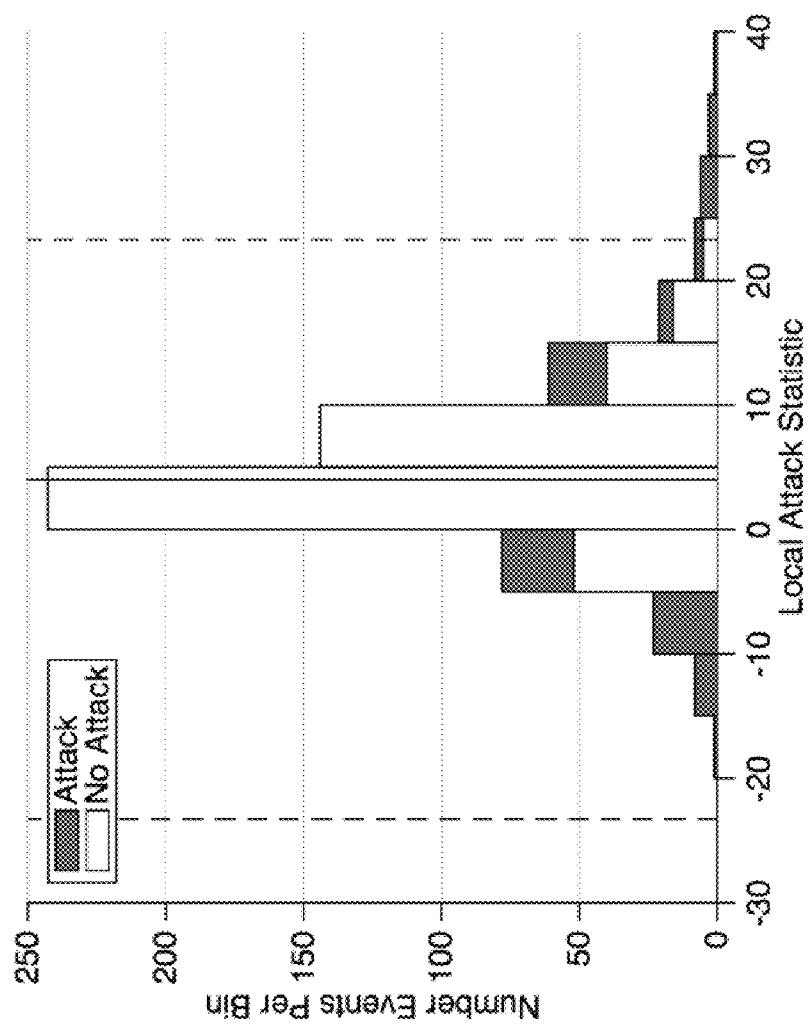
FIG. 4E is a schematic histogram of the local attack statistic for Area IV, $d_{IV}$ during attack at area I, according to some embodiments of the present disclosure.
Figure 4F:
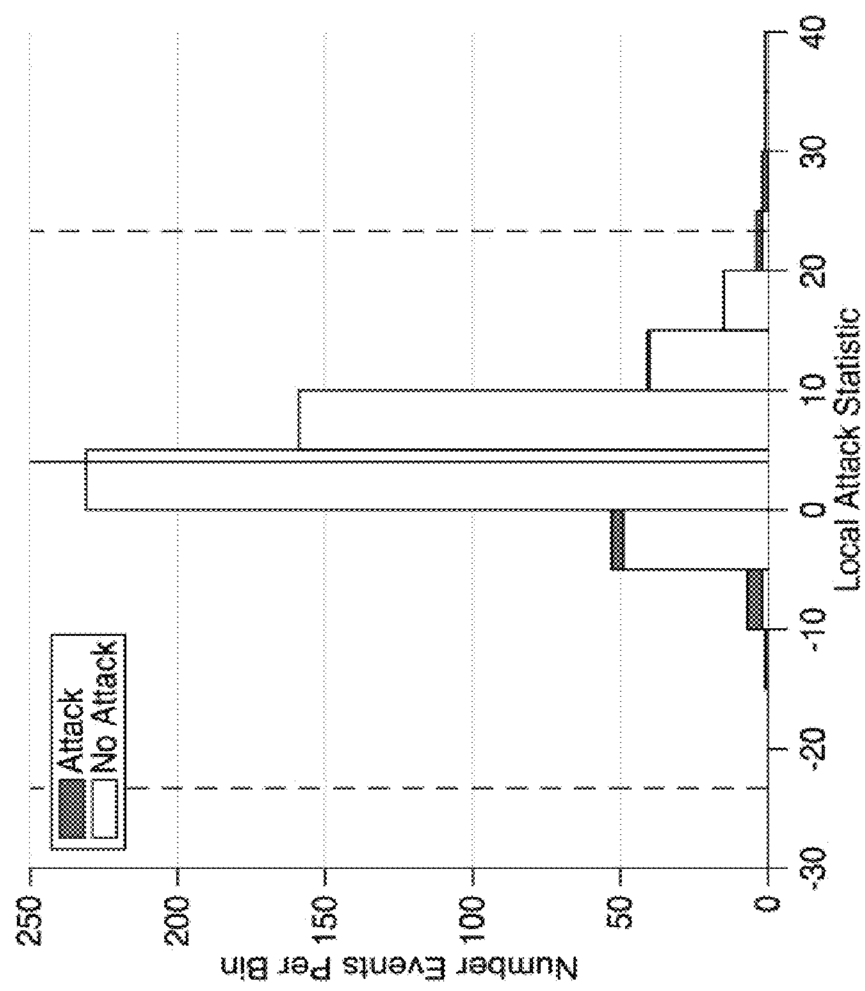
FIG. 4F is a schematic histogram of the local attack statistic for Area IV, $d_{IV}$ after attack at area I, according to some embodiments of the present disclosure.

FIG. 4D-4F show the histogram for the attack statistic $d_{IV}$ in neighboring control area IV. It can be seen that during the attack, the variance of $d_{IV}$ is only slightly increased. This points to another potential advantage of using the local attack statistic $d_I$ in (52) rather than the global attack statistic d in (32). Since the variance of the local attack statistic where the attack is taking place is increased with respect to the local statistics in other areas, this suggests that using the local attack statistic helps not only in detecting the presence of an attack but also in identifying where the attack is taking place.

Using the method described above, it can be determined that a possible attack is at control area I, but control area IV.

According to embodiments of the present disclosure a method for detecting anomalies or cyber attacks in a control system or an electric power system. The electric power system includes a set of generators and loads connected to buses, and each pair of buses are connected with branches. Wherein a voltage phase angle of each bus and a rotor frequency of each generator are measured at a pre-determined sampling frequency. Wherein the electric power system is partitioned into a set of control areas in which no common buses exist between the control areas. Wherein a mechanical power for each generator and an active power demand for each load are given for each sampling interval corresponding to the sampling frequency. The method comprising: determining a local state model and a local measurement model for each control area based on measurements at the control area and neighboring buses of adjacent control areas within a pre-determined neighborhood distance. Determining dynamic state estimations for each control area for each sampling interval using iterative inversion solution for covariance matrix and communications among adjacent control areas within the pre-determined neighborhood distance. Determining a local anomalies or cyber-attack statistic for each control area according to results of determined dynamic state estimations. Estimating the possibility for a possible anomalies or cyber attack in the control area by comparing the determined local cyber-attack statistic with a variance of measurement residuals for the control area without anomalies or cyber attack, and declaring possible anomalies, or cyber attacks, when the local statistic is greater than pre-determined multiples of non-anomalies or the non-cyber attack variance of measurement residuals.

According to aspects of the method, wherein the local state for control area I is the generator rotor angle and frequency at the generators in the control area I, $x_I=[\delta_I\ \omega_I]^T$. Wherein $x_I$ is the vector of local states, $\delta_I$ and $\omega_i$ are the vectors of rotor angle and frequency of all generators in the area; wherein the local measurements for control area I, $y_I=[\hat{\omega}_I\ \hat{\theta}_I^*]^T$, $\hat{\omega}_I$ are the rotor frequencies of all generators contained in the control area, and $\hat{\theta}_I^*$ are the weighted bus phase angles for all buses contained in the control area including the terminal buses of generators. Wherein the weighted bus phase angle at bus i is determined as a linear combination of voltage phase angles at neighboring buses and an local electric power demand $P_i^D$:

$$\hat{\theta}_i^{\Delta *} = L_i^{DD}\hat{\theta} - P_i^D,$$

$L^{DD}$ is a matrix related bus power injection to bus phase angle for all buses in the system according to the susceptances of transmission lines and transient reactance of generators in the system; $L_i^{DD}$ is the row corresponding to bus i of matrix $L^{DD}$; $\hat{\theta}$ is the vector of voltage phase angle for all buses; $\hat{\theta}_i^*$ is determined using measurements at the control area and measurements with their neighbors in other control areas within 1-hop neighborhood distance.

According to other aspects of the method, further comprising: determining the system dynamics matrix A, input control matrix B, measurement relationship matrix H, state and measurement correlation matrix C, state covariance matrix Q, and measurement covariance matrix R. Specifying the number of time steps for a period of covariance update K, the multiple threshold of standard variance of no-attack statistic for each control area $\tau_I$, $I=\{1, \ldots, N\}$, N is the total number of control areas. Calculating offline the matrices of predicted state covariance $\{P^-[k]\}_{k=0}^{K}$, estimated state covariance $\{P^+[k]\}_{k=0}^{K}$, and innovation covariance $\{S[k]\}_{k=0}^{K}$ for each time step kin the set of time steps of covariance update period, and communicating the matrices to each control area. Executing on-line cyber-physical attack detection based on a local cyber attack statistic for each control area I, I={1, . . . , N} at each time step k, k∈{1, 2, . . . , K}.

According to other aspects of the method, wherein the system dynamics matrix A, input control matrix B, state covariance matrix Q and measurement covariance matrix R are determined according to:

$$A = e^{\overline{T}\overline{A}},$$

$$B = \int_0^{\overline{T}} e^{\tau\overline{A}}\, d\tau,$$

$$Q = \int_0^{\overline{T}} e^{\overline{A}\tau}\overline{Q}e^{\overline{A}^T\tau}\, d\tau,$$

$$R = \begin{bmatrix} R_\omega & 0 \\ 0 & L^{DD}R_\theta(L^{DD})^T \end{bmatrix},$$

wherein Q is sampled process noise covariance matrix, $\overline{Q}$ is pre-determined un-sampled covariance matrix of states, $\overline{T}$ is the length of each sampling interval of phase measuring units, $\overline{A}$ is an un-sampled matrix of system dynamics related the state derivatives $\dot{x}(t)$ with states x(t), A is a sampled matrix of system dynamics related the states at next time step with states at current time steps, $\overline{A}$ are set with non-zero values at $$\overline{A}(\dot{\delta}_i(t), \omega_i(t)) = 1.0,$$

$$\overline{A}(\dot{\omega}_i(t), \delta_i(t)) = \frac{-1}{M_i Z_i},$$

$$\overline{A}(\dot{\omega}_i(t), \omega_i(t)) = -\frac{D_i}{M_i}\omega_i(t).$$

$A^T$ is the transpose of matrix A, B is an sampled matrix related the states with system inputs at the current time steps, $R_\omega$ and $R_\theta$ are the pre-determined covariance matrices for measurements of rotor frequency and bus phase angle at all generators and all buses; wherein the state x(t) includes the generator variables for all generators, $x(t)=\lfloor x_1(t)\ x_2(t)\ \ldots\ x_{n_g}(t)\rfloor^T$, and the state for generator i is defined as $x_i(t)=[\delta_i(t)\ \omega_i(t)]^T$, and the control input u(t) includes inputs for all generators, $u(t)=\lfloor u_{\delta_1}(t)\ \mu_{\omega_1}(t)\ \ldots\ u_{\delta_{n_g}}(t)\ u_{\omega_{n_g}}(t)\rfloor$, and the control input corresponding to the rotor angle and frequency of the generator at bus i are defined as:

$$u_{\delta_i}(t) = 0,\ u_{\omega_i}(t) = \frac{1}{M_i}\left(P_i^G + \frac{1}{Z_i}\theta_i\right),$$

where $n_g$ is the number of generators in the system, $M_i$, $Z_i$ and $P_i^G$ are the inertia, the transient reactance, and the mechanical power input of the generator at bus i; wherein the entries of measurement correlation matrix C are set with non-zero values at $C(\mu_{i,\delta},\hat{\theta}_j^*)$, and $C(\mu_{i,\omega},\hat{\theta}_j^*)$ if j=i or $j \in N_i$, $N_i$ is the set of 1-hop neighboring buses of bus i; wherein entries of measurement relationship matrix H are set with non-zero values at $H(\hat{\omega}_i,\omega_i)=1.0$ and $$H(\hat{\theta}_i^*, \delta_i) = \frac{1}{Z_i},\ i \in G;$$

According to other aspects of the method, the matrices of predicted state covariance, estimated state covariance, and innovation covariance for time step k are determined according to:

$$P^-[k]=AP^+[k-1]A^T+Q,$$

$$S[k]=HP^-[k]H^T+HC+C^TH^T+R,$$

$$P^{3+}[k]=P^-[k]-(P^-[k]H^T+C)S^{-1}[k](HP^-[k]+C^T),$$

$$k \in \{1, \ldots, K\};$$

According to other aspects of the method, determining local attack statistic and declare an attack for each area at time step k, further comprising: calculating predicted state estimate for each control area I at time step k. Reading measurements for local control area and communicate with neighboring areas to get measurements for neighboring buses within 1-hop neighbors. Iterating $T_{inner}$ steps to determine covariance weight vector $\beta_I$ for each control area and communicate with its l-hop neighbors of covariance weight vectors during the iterations. Using a neighbor-limited approximation to $P^-[k]$, $\tilde{P}^-[k]$ and communication $\beta_I^{T_{inner}}$ with its l-hop neighbors to determine estimated state for each control area I at time step k. Using $\beta_I^{T_{inner}}$ to update the local attack detection statistic $d_I[k]$. Checking if $|d_I[k]|>\tau_1(\mathrm{Var}(d_I[k]))$. If yes, an attack is declared.

According to other aspects of the method, wherein the predicted state estimate for each control area I at time step k are determined according to:

$$x_I^-[k]=A_I\hat{x}_I^+[k-1]+B_I u_I[k-1]$$

$x_I^-[k]$ and $\hat{x}_I^+[k-1]$ are the vectors of predicted local state at time step k, and estimated local state at time step (k−1); $A_I$ and $B_I$ are the sub-matrices of system dynamics and measurement matrices corresponding to the buses of control area I, $u_I[k-1]$ is the vector of control inputs of control area I at time step (k−1);

According to other aspects of the method, wherein the weight vector of innovation covariance for control area I, $\beta_I$ is solved iteratively according to:

$$\beta_I^{t+1}=\beta_I^t+\alpha[S^D[K]]_I^{-1}(\gamma_I-S_{I\cup N_I^l}[k]\beta_{I\cup N_I^l}^t)$$

$$t=\{0,1, \ldots, T_{inner}\}$$

wherein $T_{inner}$ is the total number of iterations, $S^D[k]$ is the diagonals of matrix S[k], α is the damping parameter and determined as a value less than the minimum of $$\frac{2S_{ii}[k]}{\sum_{j\neq i}|S_{ij}[k]|}$$

for all row i of matrix S[k]. $N_I^l$ is the set of neighboring buses of buses in the control area I within l-hop neighborhood distance. $S_{I,I\cup N_I^l}[k]$ is the entries of S[k] at rows corresponding to control area I, and columns corresponding to control area I and its l-hop neighbors, $N_I^l$. $\beta_{I\cup N_I^l}^t$ is the entries of $\beta^t$ corresponding to control area I and its l-hop neighbors, $N_I^l$.

According to other aspects of the method, the estimated state for control area I is determined according to:

$$\hat{x}_I^+[k]=\hat{x}_I^-[k]+(\tilde{P}^-[k]H^T+C)_{I,I\cup N_I^l}\beta_{I,I\cup N_I^l}^{T_{inner}}.$$

wherein $\tilde{P}^-[k]$ is a neighbor-limited approximation to $P^-[k]$, the entry of $\tilde{P}^-[k]$, $\tilde{P}_{ij}^-[k]$ is nonzero and equals to $P^-[k]$, if and only if the buses corresponding to $x_i$ and $x_j$ are at most 1-hops away. $(\tilde{P}^{-}[k]H^T+C)_{I,I\cup N_I^1}$ is the entries of $(\tilde{P}^{-}[k]H^T+C)$ at rows corresponding to control area I, and columns corresponding to control area I and its 1-hop neighbors, $N_I^1$. $\beta^{T_{inner}}$ is determined the weight vector of innovation covariance.

According to other aspects of the method, wherein the local attack detection statistic $d_I[k]$ is determined according to:

$$d_I[k] = \sum_{j=k-w+1}^{k} \gamma_I^T[j]\beta_I[j];$$

wherein $\gamma_I[k]$ is the innovation vector of measurement residual determined as:

$$\gamma_I[k] \overset{def}{=} y_I[k]-H_I\hat{x}_I^{-}[k].$$

wherein $y_I[k]$ is the vector of local measurements for control area I at time step k, $\hat{x}_I^{-}[k]$ is the vector of predicted states for control area I at time step k, w is the slide window size, and set as 1;

According to other aspects of the method, wherein the standard variance of the local attack statistic without an attack, $\mathrm{Var}(d_I[k])$ is determined according to:

$$\mathrm{var}[d_I[k]] = E[d_I^2[k]] - (E[d_I[k])^2$$

$$E[d_I[k]] = \sum_{i\in I}\sum_{l=1}^{n} S_{il}^{-1}[k]S_{il}[k]$$

$$E[d_I^2[k]] = \sum_{i,j\in I}\sum_{l,m=1}^{n} S_{il}^{-1}[k]S_{jm}^{-1}[k](S_{il}[k]S_{jm}[k] + S_{ij}[k]S_{lm}[k] + S_{im}[k]S_{lj}[k])$$

Wherein $S^{-1}[k]$ is the inverse of innovation covariance matrix S[k] at time step k, n is the total number of buses in the system.

According to a system for detecting cyber-physical attacks in an electric power system, wherein the electric power system includes a set of generators and loads connected to buses, and each pair of buses are connected with branches. Wherein a voltage phase angle of each bus and a rotor frequency of each generator are measured at a sampling frequency. Wherein the electric power system is partitioned into a set of control areas in which no common buses exist between the control areas. Wherein mechanical power for each generator and active power demand for each load are given for each sampling interval corresponding to the pre-determined sampling frequency. The system comprising: determining a local state model and a local measurement model for each control area based on measurements at the control area and neighboring buses of adjacent control areas within 1-hop neighborhood distance. Determining dynamic state estimations for each control area for each sampling interval using iterative inversion solution for state covariance matrix and communications among adjacent control areas within the pre-determined neighborhood distance. Determining a local cyber-attack statistic according to results of determined dynamic state estimations. Declaring a possible cyber attack in the control area by comparing the determined cyber-attack statistic with a variance of measurement residuals for the control area without an attack.

What is claimed is:

1. A method for detecting anomalies in a control area of a control system with multiple control areas, wherein the control area includes a set of generators in communication with a set of buses and some neighboring buses of neighboring controls area of the control system, comprising:

accessing a memory in communication with at least one hardware processor, wherein the memory includes stored historical states of the control area;

estimating, by the hardware processor, a first state of the control area over a first state time period from the historical states of the control area, using a model of dynamics of the control area, and defining a transition of the first state of the control area as a function of control inputs, wherein the first state of the control area includes a generator state for each generator in the control area, wherein the control inputs include one or combination of: a network state for each bus in the control area; a network state for some neighboring buses of neighboring controls areas; a mechanical input to each generator in the control area; or power consumptions at the buses in the control area;

updating, by the hardware processor, the estimated first state of the control area according to a measurement model of the control area, by: connecting measurements of the rotor frequency of each generator; a weighted combination of measurements of the network states on the buses in the control area and some neighboring buses of neighboring controls areas; with the generator state of each generator in the control area, to obtain a second state of the control area over a second state time period later than the first state time period; and detecting, by the hardware processor, the anomalies based on a statistic deviation of the second state of the control area from its corresponding prediction derived from the first state of the control area.

2. The method of claim 1, wherein the generator state includes a rotor angle and a frequency of each generator in the set of generators in the control area.

3. The method of claim 1, wherein the network state includes a voltage phase angle at each bus in the set of buses in the control area.

4. The method of claim 1, wherein the first state time period and the second state time period each cover approximately the same time interval.

5. The method of claim 1, wherein the control system is an electric power system (EPS).

6. The method of claim 1, wherein the anomalies include cyber-attacks and power consumption anomalies.

7. The method of claim 1, wherein the second state of the control area are real-time observations.

8. The method of claim 1, further comprising:

determining whether, the statistic deviation of the second state from its corresponding prediction derived from the first state of the control area is associated with a cyber attack based, at least in part, on historical cyber attack data stored in a memory in communication with the hardware processor.

9. The method of claim 1, further comprising:

determining whether the statistic deviation of the second state from its corresponding prediction derived from the first state of the control area is associated with a cyber attack based, at least in part, on historical anomalies associated with historical states of the control area indicating there is not a cyber attack.

10. The method of claim 9, further comprising:

receiving an input from a surface of a user interface in communication with the hardware processor, by a user, of the historical anomalies associated with historical states of the control area that are not indicative of a cyber attack.

11. The method of claim 1, further comprising:

determining, by the hardware processor, whether the statistic deviation of the second state from its corresponding prediction derived from the first state of the control area is associated with a cyber attack based, at least in part, on exceeding a cyber attack threshold;

providing a notification responsive to the statistic deviation of the second state from its corresponding prediction derived from the first state of the control area exceeding the cyber attack threshold.

12. The method of claim 1, wherein the model of dynamics of the control area includes using an iterative inversion solution for a covariance matrix and communications among adjacent control areas within the pre-determined neighborhood distance.

13. The method of claim 1, wherein the measurement model of the control area is based on measurements at the control area and neighboring buses of adjacent control areas within a pre-determined neighborhood distance.

14. The method of claim 1, wherein the detecting of the anomalies includes:

determining a function of a covariance matrix of the deviation of the second state from its corresponding prediction derived from the first state of the control area;

comparing the function of the covariance matrix with a threshold determined as a multiple of a variance of the function of the covariance matrix allowed by uncertainties of the model of dynamics and the model of measurements; and detecting a cyber-attack when the function of the covariance matrix is above the threshold.

15. A system for detecting anomalies in a control area of a power system with multiple control areas, wherein the control area includes a set of generators in communication with a set of buses and some neighboring buses of neighboring controls area of the control system, comprising:

a computer readable memory to store historical states of the control area, current states of the control area, a model of dynamics of the control area and a measurement model of the control area;

a set of sensors arranged to sense measurements in the control area for the set of generators, the set of buses and to measure one or combination of rotor frequencies for each generator, voltage phase angles on the buses, a mechanical input to each generator, or power consumptions at the buses;

a hardware processor in communication with the computer readable memory configured to:

estimate a first state of the control area from a historical state of the control area over a first state time period using the stored model of dynamics of the control area, and defining a transition of the first state of the control area as a function of control inputs, wherein the first state of the control area includes a rotor angle and a rotor frequency for each generator in the control area, wherein the control inputs include one or combination of phase angles on the buses of the control area, a mechanical input to each generator in the control area, and power consumptions at the buses in the control area;

update the estimated first state of the control area according to the stored measurement model of the control area, by connecting measurements of the rotor frequency of each generator in the control area and a weighted combination of measurements of the voltage phase angles on the buses of the control area and some neighboring buses of the neighboring control areas, with the rotor angle and the rotor frequency of each generator in the control area, to obtain a second state of the control area over a second state time period later than the first state time period; and detect the anomalies based on a statistic deviation of the second state from its corresponding prediction derived from the first state of the control area.

16. The system of claim 15, wherein the first state time period and the second state time period each cover approximately the same time interval and the second state of the control area are real-time observations.

17. The system of claim 15, wherein the detected anomalies assist in managing the management of the EPS.

18. The method of claim 15, wherein the detecting of the anomalies includes:

determining a function of a covariance matrix of the deviation of the second state from its corresponding prediction derived from the first state of the control area;

comparing the function of the covariance matrix with a threshold determined as a multiple of a variance of the function of the covariance matrix allowed by uncertainties of the model of dynamics and the model of measurements; and detecting a cyber-attack when the function of the covariance matrix is above the threshold.

19. A detector for detecting anomalies in a control area of an electric power system (EPS) with multiple control areas, wherein the control area includes a set of generators in communication with a set of buses and some neighboring buses of neighboring controls area of the control system, comprising:

acquire a plurality of measurements from sensors configure for sensing the set of generators and the set of buses over a first state time period;

acquire a respective second plurality of measurements from sensors configure for sensing the set of generators and the set of buses over a second state time period;

at least one hardware processor having a computer readable memory configured to:

receive the plurality of measurements sensed by the sensors over the first state time period;

estimate a first state of the control area from a historical state of the control area over the first state time period using a model of dynamics of the control area, and defining a transition of the first state of the control area as a function of control inputs, wherein the first state of the control area includes a rotor angle and a rotor frequency for each generator in the control area, wherein the control inputs include one or combination of phase angles on the buses of the control area, a mechanical input to each generator in the control area, and power consumptions at the buses in the control area;

receive the plurality of measurements sensed by the sensors over the second state time period;

update the estimated first state of the control area according to a measurement model of the control area, by connecting sensed measurements of the rotor frequency of each generator in the control area and a weighted combination of sensed measurements of the phase angles on the buses of the control area and some neighboring buses of the neighboring control areas, with the rotor angle and the rotor frequency of each generator in the control area, to obtain a second state of the control area over the second state time period later than the first state time period; and detect the anomalies based on a statistic deviation of the second state of the control area from its corresponding prediction derived from the first state of the control area.

20. The detector of claim 19, wherein the first state time period and the second state time period each cover approximately the same time interval and the second state of the control area are real-time observations.

* * * * *